(12) United States Patent
Imanishi et al.

(10) Patent No.: US 12,091,057 B2
(45) Date of Patent: Sep. 17, 2024

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yuki Imanishi, Wako (JP); Katsuya Yashiro, Wako (JP); Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 288 days.

(21) Appl. No.: 17/674,940

(22) Filed: Feb. 18, 2022

(65) Prior Publication Data

US 2022/0297727 A1 Sep. 22, 2022

(30) Foreign Application Priority Data

Mar. 16, 2021 (JP) ................. 2021-042033

(51) Int. Cl.
*B60W 60/00* (2020.01)
*B60W 40/04* (2006.01)
(Continued)

(52) U.S. Cl.
CPC ........ *B60W 60/0051* (2020.02); *B60W 40/04* (2013.01); *B60W 40/105* (2013.01);
(Continued)

(58) Field of Classification Search
CPC ............... B60W 10/20; B60W 30/143; B60W 30/18163; B60W 30/182; B60W 40/04;
(Continued)

(56) References Cited

U.S. PATENT DOCUMENTS 10,101,743 B2 * 10/2018 Abe ................. B60W 60/0059
10,336,345 B2 * 7/2019 Hatano ................. B60W 50/12
(Continued)

FOREIGN PATENT DOCUMENTS

| JP | 2016-504232 | 2/2016 |
|---|---|---|
| JP | 2017-174282 | 9/2017 |
| WO | 2014/085380 | 6/2014 |
| WO | 2018/122966 | 7/2018 |
| WO | 2018/138765 | 8/2018 |

OTHER PUBLICATIONS

Japanese Office Action for Japanese Patent Application No. 2021-042033 dated Nov. 8, 2022.

*Primary Examiner* — Andrew Joseph Rudy
(74) *Attorney, Agent, or Firm* — Amin, Turocy & Watson, LLP

(57) ABSTRACT

A vehicle control device includes a recognizer configured to recognize a surrounding situation of a vehicle, a driving controller configured to control the vehicle, and a first receiver configured to receive a switching operation on a driving mode. The driving controller causes the vehicle to travel in any one of a plurality of driving modes including a first mode and a second mode that a task imposed on an occupant is milder than that in the first mode, and performs acceleration/deceleration control so that a vehicle speed becomes a target speed in a state that the first mode is being executed and the second mode is executable and switches the driving mode from the first mode to the second mode when the first receiver has received an operation for switching the driving mode to the second mode in a state that the speed has become the target speed.

13 Claims, 13 Drawing Sheets

(51) Int. Cl.
*B60W 40/105*         (2012.01)
*B60W 50/10*          (2012.01)

(52) U.S. Cl.
CPC ..... *B60W 50/10* (2013.01); *B60W 2554/4041* (2020.02); *B60W 2554/80* (2020.02); *B60W 2555/60* (2020.02); *B60W 2556/35* (2020.02)

(58) Field of Classification Search
CPC .............. B60W 40/105; B60W 50/10; B60W 60/0051; B60W 2554/4041; B60W 2554/80; B60W 2050/0083; B60W 2050/143; B60W 2050/146; B60W 2555/60; B60W 2556/35; B60W 50/14
USPC ...................................................... 701/1, 23
See application file for complete search history.

(56) References Cited

U.S. PATENT DOCUMENTS

| | | | |
|---|---|---|---|
| 10,452,074 B2 * | 10/2019 | Luo | B60W 30/09 |
| 10,787,199 B2 * | 9/2020 | Kim | B60W 10/20 |
| 10,889,304 B2 * | 1/2021 | Hatano | B60W 60/0057 |
| 10,921,804 B2 * | 2/2021 | Okimoto | B60W 50/10 |
| 11,643,099 B2 * | 5/2023 | Cullinane | G05D 1/0223 |
| | | | 701/23 |
| 11,702,110 B2 * | 7/2023 | Guo | B60W 60/0051 |
| | | | 701/23 |
| 2019/0354108 A1 | 11/2019 | Okajima et al. | |
| 2021/0061312 A1 | 3/2021 | Wang | |
| 2022/0297692 A1 * | 9/2022 | Imanishi | B60W 10/04 |

* cited by examiner

FIG. 2

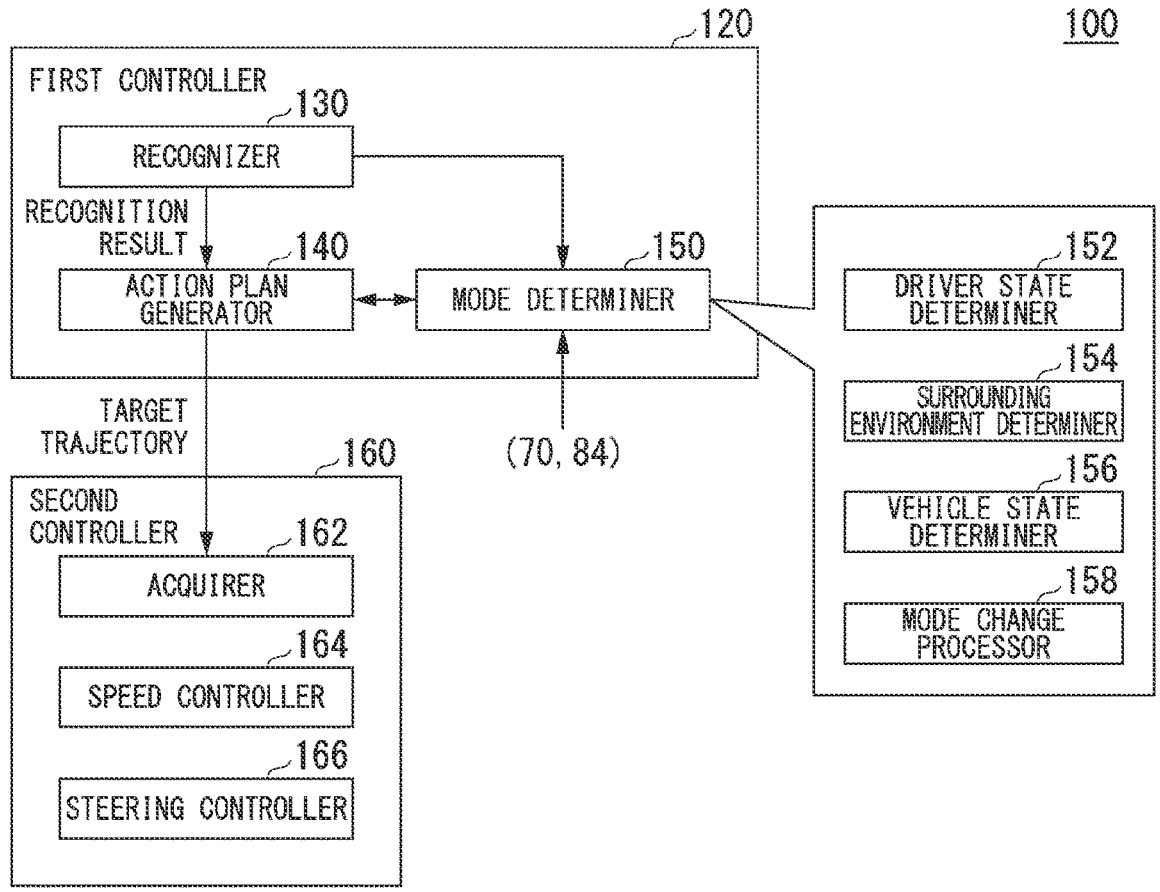

FIG. 3

| DRIVING MODE | CONTROL STATE | TASK | |
|---|---|---|---|
| MODE A | AUTOMATED DRIVING | SURROUNDING MONITORING: UNNECESSARY<br>STEERING GRIP: UNNECESSARY | ↑ TASK: MILD |
| MODE B | DRIVING ASSISTANCE | SURROUNDING MONITORING: NECESSARY<br>STEERING GRIP: UNNECESSARY | |
| MODE C | DRIVING ASSISTANCE | SURROUNDING MONITORING: NECESSARY<br>STEERING GRIP: NECESSARY | |
| MODE D | DRIVING ASSISTANCE | SURROUNDING MONITORING: NECESSARY<br>AT LEAST CERTAIN DEGREE OF DRIVING OPERATION IS NECESSARY | |
| MODE E | MANUAL DRIVING | SURROUNDING MONITORING: NECESSARY<br>DRIVING OPERATION IS NECESSARY TOGETHER WITH STEERING AND/OR ACCELERATION/DECELERATION | ↓ TASK: SEVERE |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2021-042033, filed Mar. 16, 2021, the content of which is incorporated herein by reference.

BACKGROUND

Field of the Invention

The present invention relates to a vehicle control device, a vehicle control method, and a storage medium.

Description of Related Art

In recent years, research on automated driving that automatically controls the traveling of a vehicle has been conducted. In this regard, technology for executing automated driving under a specific condition such as congestion tracking is known (for example, PCT International Publication No. WO 2018/138765).

SUMMARY

However, a case where a driving control process in which tasks imposed on an occupant are mild is appropriately performed under various situations including a situation in which there are other vehicles in a nearby area and the like has not been taken into consideration.

Aspects of the present invention have been made in consideration of such circumstances and provide a vehicle control device, a vehicle control method, and a storage medium capable of more appropriately executing a driving control process in which tasks imposed on an occupant are mild under various situations.

A vehicle control device, a vehicle control method, and a storage medium according to the present invention adopt the following configurations.

(1): According to an aspect of the present invention, there is provided a vehicle control device including: a recognizer configured to recognize a surrounding situation of a vehicle; a driving controller configured to control one or both of steering, acceleration, and deceleration of the vehicle on the basis of the surrounding situation recognized by the recognizer; and a first receiver configured to receive a switching operation on a driving mode of the vehicle by an occupant of the vehicle, wherein the driving controller causes the vehicle to travel in any one of a plurality of driving modes including a first driving mode and a second driving mode in which a task imposed on the occupant is milder than that in the first driving mode, and wherein the driving controller performs acceleration/deceleration control so that a speed of the vehicle becomes a target speed in a state in which the first driving mode is being executed and the second driving mode is executable and switches the driving mode from the first driving mode to the second driving mode when the first receiver has received an operation for switching the driving mode to the second driving mode in a state in which the speed has become the target speed.

(2): In the above-described aspect (1), the driving controller switches the driving mode from the first driving mode to the second driving mode when the vehicle has traveled for a prescribed distance or more or a prescribed time period or more on an expressway and when the first receiver has received an operation of switching the driving mode to the second driving mode after the speed of the vehicle became the target speed.

(3): In the above-described aspect (1), the vehicle control device further includes an output controller configured to cause an output to output information about the driving mode, wherein the output controller causes the output to output information for suggesting that the occupant perform a process of causing the vehicle to travel in the second driving mode when the speed has become the target speed, and wherein the driving controller switches the driving mode from the first driving mode to the second driving mode when the first receiver has received an operation of switching the driving mode to the second driving mode after the information was output to the output.

(4): In the above-described aspect (1), acceleration or deceleration to the target speed is performed according to speed control based on an operation of the occupant or speed control by the driving controller.

(5): In the above-described aspect (1), the vehicle control device further includes a second receiver configured to receive a set speed when the vehicle travels in the first driving mode, wherein the driving controller adjusts the speed of the vehicle on the basis of the set speed received by the second receiver.

(6): In the above-described aspect (3), the output controller causes the output to output information for prompting the occupant to adjust the speed of the vehicle when control of the speed of the vehicle based on an operation of the occupant is performed.

(7): In the above-described aspect (5), the driving controller switches the driving mode from the first driving mode to the second driving mode when the speed of the vehicle has become the target speed according to adjustment of the set speed.

(8): In the above-described aspect (1), the target speed is a speed less than or equal to a legal speed of a traveling lane of the vehicle.

(9): In the above-described aspect (8), the driving controller restricts execution of the second driving mode when a lower limit speed of the traveling lane is set and the speed of the vehicle is less than the lower limit speed of the traveling lane.

(10): In the above-described aspect (9), the driving controller continues the second driving mode when the speed of the vehicle becomes less than the lower limit speed after the second driving mode is executed.

(11): In the above-described aspect (1), lanes in which the vehicle travels include a passing lane for passing a preceding vehicle, and the driving controller switches the driving mode from the first driving mode to the second driving mode when the vehicle is traveling in the passing lane in a state in which the vehicle is executing the first driving mode and the second driving mode is executable and when the first receiver has received an operation of switching the driving mode to the second driving mode after a lane change from the passing lane to a lane other than the passing lane was made and the speed of the vehicle became a target speed or after the speed of the vehicle became the target speed and then the lane change from the passing lane to the lane other than the passing lane was made.

(12): According to another aspect of the present invention, there is provided a vehicle control device including: a recognizer configured to recognize a surrounding situation of a vehicle; a driving controller configured to control one or both of steering, acceleration, and deceleration of the vehicle on the basis of the surrounding situation recognized by the recognizer; and a second receiver configured to receive a set speed when the vehicle travels in a first driving mode, wherein the driving controller causes the vehicle to travel in any one of a plurality of driving modes including the first driving mode and a second driving mode in which a task imposed on an occupant of the vehicle is milder than that in the first driving mode, and wherein the driving controller performs acceleration/deceleration control so that a speed of the vehicle becomes a target speed on the basis of the set speed received by the second receiver in a state in which the first driving mode is being executed and the second driving mode is executable and switches the driving mode from the first driving mode to the second driving mode when the speed has become the target speed.

(13): According to yet another aspect of the present invention, there is provided a vehicle control method including: recognizing, by a computer, a surrounding situation of a vehicle; controlling, by the computer, one or both of steering, acceleration, and deceleration of the vehicle on the basis of the surrounding situation recognized by the recognizer; receiving, by the computer, a switching operation on a driving mode of the vehicle by an occupant of the vehicle; causing, by the computer, the vehicle to travel in any one of a plurality of driving modes including a first driving mode and a second driving mode in which a task imposed on the occupant of the vehicle is milder than that in the first driving mode; performing, by the computer, acceleration/deceleration control so that a speed of the vehicle becomes a target speed in a state in which the first driving mode is being executed and the second driving mode is executable; and switching, by the computer, the driving mode from the first driving mode to the second driving mode when an operation for switching the driving mode to the second driving mode has been received in a state in which the speed has become the target speed.

(14): According to yet another aspect of the present invention, there is provided a computer-readable non-transitory storage medium storing a program for causing a computer to: recognize a surrounding situation of a vehicle; control one or both of steering, acceleration, and deceleration of the vehicle on the basis of the surrounding situation recognized by the recognizer; receive a switching operation on a driving mode of the vehicle by an occupant of the vehicle; cause the vehicle to travel in any one of a plurality of driving modes including a first driving mode and a second driving mode in which a task imposed on the occupant of the vehicle is milder than that in the first driving mode; perform acceleration/deceleration control so that a speed of the vehicle becomes a target speed in a state in which the first driving mode is being executed and the second driving mode is executable; and switch the driving mode from the first driving mode to the second driving mode when an operation for switching the driving mode to the second driving mode has been received in a state in which the speed has become the target speed.

According to the above-described aspects (1) to (14), it is possible to more appropriately execute a driving control process in which tasks imposed on an occupant are mild under various situations.

BRIEF DESCRIPTION OF THE DRAWINGS

FIG. 2 is a functional configuration diagram of a first controller and a second controller.

FIG. 3 is a diagram showing an example of relationships between driving modes, control states of a host vehicle M, and tasks.

DESCRIPTION OF EMBODIMENTS

Hereinafter, embodiments of a vehicle control device, a vehicle control method, and a storage medium of the present invention will be described with reference to the drawings.

First Embodiment

[Overall Configuration]

Figure 1:
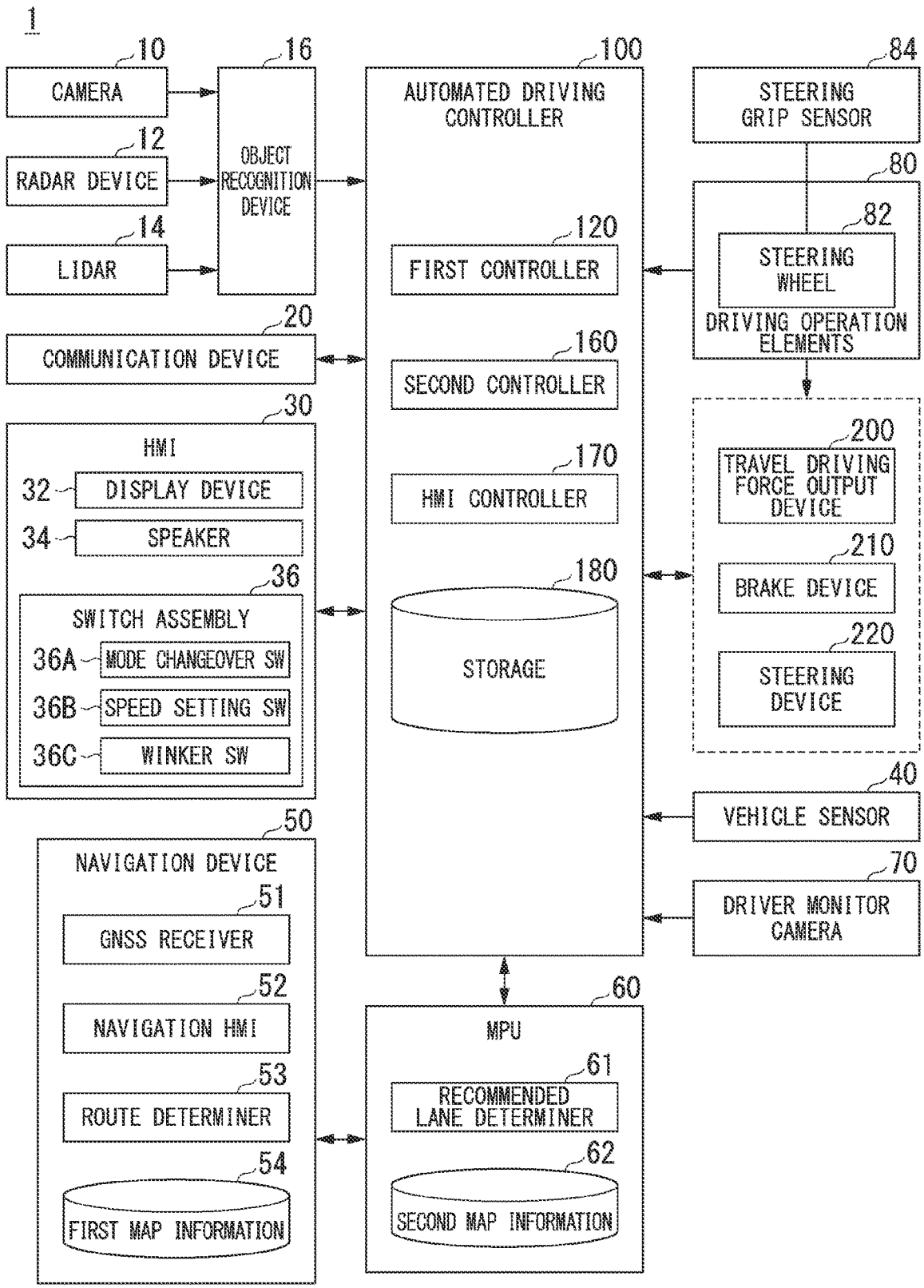
FIG. 1 is a configuration diagram of a vehicle system using a vehicle control device according to a first embodiment.

FIG. 1 is a configuration diagram of a vehicle system 1 using a vehicle control device according to a first embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power when a secondary battery or a fuel cell is discharged. Hereinafter, an embodiment in which a vehicle control device is applied to an automated driving vehicle will be described as an example. The automated driving is, for example, automatically controlling one or both of steering, acceleration, and deceleration of the vehicle to execute the driving control. The driving control of the vehicle described above may include, for example, various types of driving assistance such as adaptive cruise control (ACC), auto lane changing (ALC), lane keeping assistance system (LKAS), and traffic jam pilot (TJP). The automated driving vehicle has a manual driving mode in which driving is controlled according to the manual driving of an occupant (a driver).

For example, the vehicle system 1 includes a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, driving operation elements 80, an automated driving controller 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added. The HMI 30 is an example of an "output." The automated driving controller 100 is an example of a "vehicle control device."

For example, the camera 10 is a digital camera using a solid-state imaging element such as a charge coupled device (CCD) or a complementary metal oxide semiconductor (CMOS). The camera 10 is attached to any position on the vehicle (hereinafter, a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any position on the host vehicle M. The radar device 12 may detect a position and a speed of the physical object in a frequency modulated continuous wave (FM-CW) scheme.

The LIDAR 14 radiates light (or electromagnetic waves of a wavelength close to an optical wavelength) to the vicinity of the host vehicle M and measures scattered light. The LIDAR 14 detects a distance to an object on the basis of a time period from light emission to light reception. The radiated light is, for example, pulsed laser light. The LIDAR 14 is attached to any position on the host vehicle M.

The object recognition device 16 performs a sensor fusion process on detection results from some or all of the camera 10, the radar device 12, and the LIDAR 14 to recognize a position, a type, a speed, and the like of a physical object. The object recognition device 16 outputs recognition results to the automated driving controller 100. The object recognition device 16 may output detection results of the camera 10, the radar device 12, and the LIDAR 14 to the automated driving controller 100 as they are. The object recognition device 16 may be omitted from the vehicle system 1.

The communication device 20 communicates with another vehicle in the vicinity of the host vehicle M using, for example, a cellular network, a Wi-Fi network, Bluetooth (registered trademark), dedicated short range communication (DSRC), or the like, or communicates with various types of server devices via a radio base station.

The HMI 30 presents various types of information to the occupant of the host vehicle M according to control of the HMI controller 170 and receives an input operation by the occupant. The HMI 30 includes, for example, a display device 32, a speaker 34, and a switch assembly 36. The HMI 30 may include a microphone, a buzzer, a key, and the like.

The display device 32 is, for example, a liquid crystal display (LCD), an organic electro luminescence (EL) display device, or the like. The display device 32 is provided, for example, near the front of the driver's seat (the seat closest to a steering wheel SW) on an instrument panel, and is installed at a position where the occupant can perform visual recognition from the steering wheel gap or through the steering wheel. Information necessary for traveling during manual driving or automated driving of the host vehicle M (hereinafter referred to as driving assistance information) is displayed as an image on the display device 32. The driving assistance information includes, for example, information such as a speed of the host vehicle M, an engine speed, the remaining amount of fuel, a radiator water temperature, a traveling distance, a state of a shift lever, a lane (a marking) or other vehicles recognized by the object recognition device 16, the automated driving controller 100, or the like, a lane in which the host vehicle M should travel, and a future target trajectory. Also, the driving assistance information may include information for asking the occupant about whether or not to switch the driving mode of the host vehicle M, information indicating a state of driving control, and the like and the like.

The display device 32 may be installed near the center of the instrument panel IP in addition to the above-described position. In this case, in addition to the driving assistance information, the display device 32 displays, for example, an image showing a navigation result of the navigation device 50 and the like. The display device 32 may display a television program or may display content stored in a DVD or content such as a movie downloaded from an external device via the communication device 20.

The display device 32 may include, for example, a head up display (HUD). The HUD projects an image onto a prescribed image formation unit. The HUD, for example, projects an image onto a part of the front windshield in front of the driver's seat so that the eyes of the occupant sitting in the driver's seat can see the virtual image. For example, driving assistance information is displayed on the HUD. The display control on the display device 32 is controlled by the HMI controller 170 to be described below. The display device 32 may be configured as a touch panel having a function of a receiver that receives an operation input from the occupant.

At least one speaker 34 is installed within a cabin. For example, the speaker 34 outputs speech, a warning sound, or the like under the control of the HMI controller 170.

The switch assembly 36 includes, for example, a mode changeover switch (hereinafter, the switch is referred to as "SW") 36A, a speed setting SW 36B, and a winker SW (a direction indicator) 36C. The mode changeover SW 36A is an example of a "first receiver." The speed setting SW 36B is an example of a "second receiver." The mode changeover SW 36A and the speed setting SW 36B are attached to, for example, the steering wheel. The winker SW 36C is provided on, for example, a steering column or a steering wheel. At least some of the mode changeover SW 36A, the speed setting SW 36B, and the winker SW 36C may be provided as a graphical user interface (GUI) switch displayed on the display device 32 functioning as the touch panel. The mode changeover SW 36A is a switch that receives an operation of switching the driving mode of the host vehicle M from the occupant. When the mode changeover SW 36A has been operated, for example, the driving mode of the host vehicle M is switched between executable driving modes according to an ON/OFF operation. The mode changeover SW 36A may be a switch for selecting one of a plurality of driving modes. The mode changeover SW 36A may be a switch for receiving the approval of the occupant with respect to an inquiry about whether or not to switch the mode. The mode changeover SW 36A may be a switch for stopping the mode switching.

The speed setting SW 36B is a switch for receiving a set speed targeted by the host vehicle M from the occupant when a prescribed driving mode is executed. Hereinafter, the speed set by the speed setting SW 36B will be referred to as a "set speed." The winker SW 36C is, for example, an example of an operation unit that receives an instruction for making a lane change of the host vehicle M from the occupant. For example, when the winker SW 36C has been operated in a direction in which the host vehicle M makes a lane change, a light (a winker) outside of the vehicle associated with the direction in which the host vehicle M makes the lane change blinks.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like. The vehicle sensor 40 may include a position sensor that acquires a position of the host vehicle M. The position sensor is, for example, a sensor that acquires position information (longitude/latitude information) from a Global Positioning System (GPS) device. The position sensor may be a sensor that acquires position information using a global navigation satellite system (GNSS) receiver 51 of the navigation device 50.

For example, the navigation device 50 includes the GNSS receiver 51, a navigation HMI 52, and a route determiner 53. The navigation device 50 retains first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include curvature of a road, point of interest (POI) information, and the like. The route on the map is output to the MPU 60. The navigation device 50 may perform route guidance using the navigation HMI 52 based on the route on the map. The navigation device 50 may be implemented, for example, according to a function of a terminal device such as a smartphone or a tablet terminal possessed by the occupant.

The navigation device 50 may transmit a current position and a destination to a navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] in a traveling direction of the vehicle), and determines a recommended lane for each block with reference to the second map information 62. The recommended lane determiner 61 determines what number lane the vehicle travels in from the left. For example, the recommended lane determiner 61 determines the recommended lane so that the host vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. The second map information 62 may include road information (a type of road), legal speeds (a speed limit, a maximum speed, and a minimum speed), traffic regulation information, address information (an address/postal code), facility information, telephone number information, and the like. The second map information 62 may be updated at any time when the communication device 20 communicates with another device.

The driver monitor camera 70 is, for example, a digital camera that uses a solid-state image sensor such as a CCD or a CMOS. For example, the driver monitor camera 70 is attached to any location on the host vehicle M with respect to a position and a direction where the head of an occupant (hereinafter referred to as a driver) sitting in the driver's seat of the host vehicle M can be imaged from the front (in a direction in which his/her face is imaged). For example, the driver monitor camera 70 is attached to an upper part of a display device provided on the central portion of the instrument panel of the host vehicle M.

The driving operation elements 80 include, for example, an accelerator pedal, a brake pedal, a shift lever, and other operation elements in addition to the steering wheel 82. A sensor for detecting an amount of operation or the presence or absence of an operation is attached to the driving operation element 80 and a detection result is output to the automated driving controller 100 or some or all of the travel driving force output device 200, the brake device 210, and the steering device 220. The steering wheel 82 is an example of an "operation element for receiving a steering operation by the driver." The operation element does not necessarily have to be annular and may be in the form of a variant steering wheel, a joystick, a button, or the like. A steering grip sensor 84 is attached to the steering wheel 82. The steering grip sensor 84 is implemented by a capacitance sensor or the like, and outputs a signal for detecting whether or not the driver is gripping the steering wheel 82 (indicating that the driver is in contact with the steering wheel 82 in a state in which a force is applied) to the automated driving controller 100.

The automated driving controller 100 includes, for example, a first controller 120, a second controller 160, an HMI controller 170, and a storage 180. Each of the first controller 120, the second controller 160, and the HMI controller 170 is implemented, for example, by a hardware processor such as a central processing unit (CPU) executing a program (software). Some or all of the above components may be implemented by hardware (including a circuit; circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be prestored in a storage device (a storage device including a non-transitory storage medium) such as an HDD or a flash memory of the automated driving controller 100 or may be stored in a removable storage medium such as a DVD or a CD-ROM and installed in the HDD or the flash memory of the automated driving controller 100 when the storage medium (the non-transitory storage medium) is mounted in a drive device. A combination of the action plan generator 140 and the second controller 160 is an example of a "driving controller." The HMI controller 170 is an example of an "output controller."

The storage 180 may be implemented by the above-described various types of storage devices or a solid-state drive (SSD), an electrically erasable programmable read-only memory (EEPROM), a read-only memory (ROM), a random-access memory (RAM), or the like. The storage 180 stores, for example, information, a program, various other types of information, and the like necessary for executing the driving control in the present embodiment.

FIG. 2 is a functional configuration diagram of the first controller 120 and the second controller 160. The first controller 120 includes, for example, a recognizer 130, the action plan generator 140, and a mode determiner 150. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like with which pattern matching is possible) in parallel and performing comprehensive evaluation by assigning scores to both the recognitions. Thereby, the reliability of automated driving is secured.

The recognizer 130 recognizes states of positions (or relative positions), speeds (or relative speeds), acceleration, and the like of physical objects (for example, other vehicles or other obstacles) near the host vehicle M on the basis of information input from the camera 10, the radar device 12, and the LIDAR 14 via the object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a represented area. The "state" of a physical object may include acceleration or jerk of the physical object or an "action state" (for example, whether or not a lane change is being made or intended) when the physical object is a moving object such as another vehicle.

For example, the recognizer 130 recognizes a lane in which the host vehicle M is traveling (a traveling lane). For example, the recognizer 130 recognizes the traveling lane by comparing a pattern of a road marking (for example, an arrangement of solid lines and broken lines) obtained from the second map information 62 with a pattern of road markings in the vicinity of the host vehicle M recognized from an image captured by the camera 10. The recognizer 130 may recognize the traveling lane by recognizing a traveling path boundary (a road boundary) including a road marking, a road shoulder, a curbstone, a median strip, a guardrail, or the like as well as a road marking. In this recognition, a position of the host vehicle M acquired from the navigation device 50 or a processing result of the INS may be added. The recognizer 130 recognizes a temporary stop line, an obstacle, red traffic light, a toll gate, a road sign, and other road events. The recognizer 130 recognizes an adjacent lane adjacent to the traveling lane. The adjacent lane is, for example, a lane in which traveling is possible in the same direction as the traveling lane.

When the traveling lane is recognized, the recognizer 130 recognizes a position or an orientation of the host vehicle M with respect to the traveling lane. For example, the recognizer 130 may recognize a gap of a reference point of the host vehicle M from the center of the lane and an angle formed with respect to a line connected to the center of the lane in a traveling direction of the host vehicle M as a relative position and an orientation of the host vehicle M related to the traveling lane. Alternatively, the recognizer 130 may recognize a position of the reference point of the host vehicle M related to one side end (a road marking or a road boundary) of the traveling lane or the like as a relative position of the host vehicle M related to the traveling lane. Here, the reference point of the host vehicle M may be the center of the host vehicle M or the center of gravity. The reference point may be an end (a front end or a rear end) of the host vehicle M or may be a position where one of a plurality of wheels provided in the host vehicle M is present.

The action plan generator 140 generates a future target trajectory along which the host vehicle M automatedly travels (independently of the driver's operation) so that the host vehicle M can generally travel in the recommended lane determined by the recommended lane determiner 61 and cope with a surrounding situation of the host vehicle M. For example, the target trajectory includes a speed element. For example, the target trajectory is represented by sequentially arranging points (trajectory points) at which the host vehicle M is required to arrive. The trajectory points are points at which the host vehicle M is required to arrive for each prescribed traveling distance (for example, about several meters [m]) along a road. In addition, a target speed and target acceleration for each prescribed sampling time (for example, about several tenths of a second [sec]) are generated as parts of the target trajectory. The trajectory point may be a position at which the host vehicle M is required to arrive at the sampling time for each prescribed sampling time. In this case, information about the target speed or the target acceleration is represented by an interval between the trajectory points. When a set speed of the host vehicle M is predetermined, the action plan generator 140 may generate a target trajectory so that the speed of the host vehicle M becomes the set speed within a range in which the vehicle M can travel.

The action plan generator 140 may set an automated driving event (function) when a target trajectory is generated. Automated driving events include a constant-speed traveling event, a low-speed tracking event, a lane change event, a branch point-related movement event, a merge point-related movement event, a takeover event, and the like. The action plan generator 140 generates a target trajectory according to an activated event.

The mode determiner 150 sets the driving mode executed by the host vehicle M to any one of a plurality of driving modes in which tasks imposed on the occupant are different (in other words, a plurality of modes having different degrees of automation) on the basis of a situation of the host vehicle M and the like. The driving controller causes the host vehicle M to travel in the mode determined by the mode determiner 150. The mode determiner 150 includes, for example, a driver state determiner 152, a surrounding environment determiner 154, a vehicle state determiner 156, and a mode change processor 158. These individual functions will be described below. In the following description, it is assumed that the occupant is the driver.

FIG. 3 is a diagram showing an example of relationships between driving modes, control states of the host vehicle M, and tasks. The driving modes of the host vehicle M include, for example, five modes from mode A to mode E. A degree of automation of the control state, i.e., the driving control of the host vehicle M, is highest in mode A among modes A to E, decreases in the order of mode B, mode C, and mode D, and is lowest in mode E. In contrast, the task imposed on the occupant is mildest in mode A, becomes severer in the order of mode B, mode C, and mode D, and is severest in mode E in which manual driving is performed. In modes B to E, the control state is not automated driving, so the automated driving controller 100 is responsible for ending the control related to automated driving and performing the shift to driving assistance or manual driving. Mode B is an example of a "first driving mode" and mode A is an example of a "second driving mode." First driving modes may include modes C to E.

In mode A, the state is an automated driving state and any one of tasks of monitoring the surroundings of the host vehicle M and gripping the steering wheel 82 (hereinafter referred to as a "steering grip") is not imposed on the driver. It is determined whether or not the driver is monitoring the surroundings on the basis of, for example, a captured image analysis result of the driver monitor camera 70 and it is determined whether or not the driver is gripping the steering according to, for example, a detection result of the steering grip sensor 84. Surrounding monitoring includes at least monitoring in front of the host vehicle M. The front is a space in the traveling direction of the host vehicle M that is visually recognized via a front windshield. However, even in mode A, the driver is required to be in a posture in which a fast shift to manual driving is enabled in response to a request from the system centered on the automated driving controller 100. The term "automated driving" mentioned herein means that both the steering and speed of the host vehicle M are controlled without depending on the driver's operation.

Mode A is a driving mode that is executable when a condition in which the host vehicle M is traveling at a prescribed speed (for example, about 50 [km/h]) or less on a motorway such as an expressway and there is a preceding vehicle to be tracked is satisfied and may be referred to as a "TJP mode." In addition to the above-mentioned TJP mode, mode A is a driving mode executable in a range in which the speed of the host vehicle M does not exceed a legal speed (a speed limit) of a traveling lane when the situation of the host vehicle M satisfies a prescribed condition and may be referred to as an "independent automated driving mode." When the independent automated driving mode is executed, for example, a condition in which the speed of the host vehicle M does not exceed the legal speed (the maximum speed) of the traveling lane and a condition of a mode switching instruction (approval) according to a prescribed operation of the driver or the like as necessary are required. When the condition for traveling in mode A is no longer satisfied or when the mode switching instruction has been received by the mode changeover SW 36A, the mode determiner 150 changes the driving mode of the host vehicle M to another mode (for example, mode B).

The driver can execute a second task while mode A is being executed. The second task is, for example, an act other than the driver's driving permitted during the automated driving of the host vehicle M. Second tasks include, for example, watching television, making portable phone calls, sending and receiving emails, eating, and the like.

In mode B, the state is a driving assistance state and a task of monitoring the surroundings of the host vehicle M (hereinafter, surrounding monitoring) is imposed on the driver, but the task of gripping the steering wheel 82 is not imposed on the driver. In mode B, for example, ACC, ALC, LKAS, and the like are executed. ACC, ALC, and LKAS may also be executed, for example, in modes C and D under the restriction of a prescribed task. For example, in mode B, the lane change (ALC) of the host vehicle M based on a process in which the navigation device 50 sets a route to a destination or the like is made according to the determination of the vehicle system 1 side in a state in which the lane change instruction is not received from the driver. The lane change is used to move the host vehicle M from a host vehicle lane in which the host vehicle M is traveling to an adjacent lane adjacent to the host vehicle lane.

In mode C, the state is a driving assistance state and the surrounding monitoring task and the task of gripping the steering wheel 82 are imposed on the driver. For example, in mode C, an inquiry is sent to the driver via the HMI 30 when it is determined that the lane change of the host vehicle M is required on the vehicle system 1 side and driving assistance for making the lane change is provided when the approval of the lane change by the occupant has been received from the HMI 30 or the like.

Mode D is a driving mode in which a certain degree of driving operation by the driver is required with respect to at least one of steering, acceleration, and deceleration of the host vehicle M. In mode D, when an instruction for causing the host vehicle M to make a lane change has received from the driver according to an operation on the winker SW 36C, driving assistance for making the lane change in an indicated direction is provided. The lane change in mode D may be made in mode C. An operation on the winker SW 36C by the driver is an example of a driving operation. The lane change in modes B to D may be an example of a lane change event.

In mode E, all of steering, acceleration, and deceleration of the host vehicle M are in a state of manual driving in which a driving operation by the driver is required. In both modes D and E, the task of monitoring the front of the host vehicle M is naturally imposed on the driver. The driving subject in modes C to E is the driver.

The mode determiner 150 determines the driving mode to be executed by the host vehicle M on the basis of the state of the driver, the surrounding environment of the host vehicle M, and the state of the host vehicle M. The mode determiner 150 may determine whether or not the state is a state (a ready state) in which the driving mode can be switched from the current driving mode to a driving mode in which the task imposed on the driver is mild or may make a change to an appropriate mode according to a situation in the case of a situation in which the current driving mode is not executable. The mode determiner 150 may acquire the execution state of the task and change the driving mode of the host vehicle M to a driving mode in which the task imposed on the occupant is severer when the task associated with the determined driving mode is not executed by the driver.

For example, when the state is a state in which mode A is executable (the ready state for mode A) while mode B (or modes C to E) is (or are) being executed, the mode determiner 150 causes the HMI controller 170 to execute a control process of asking the driver about whether or not to switch the mode to mode A using the HMI 30. After the reception of the instruction (approval) for switching the mode to mode A, the mode determiner 150 determines to switch the driving mode to mode A when the state of the host vehicle M satisfies a prescribed condition.

The mode determiner 150 causes the HMI controller 170 to perform a control process of prompting the driver to shift the driving mode to the manual driving of mode E using the HMI 30, for example, when the driver is in a posture in which the driving mode cannot be shifted to manual driving in response to a request from the system (for example, when he/she continues to look outside of an allowable area or when a sign indicating that driving becomes difficult is detected) while mode A is being executed. When there is no response from the driver even though a prescribed time period elapsed after the HMI controller 170 was allowed to execute a control process of prompting the driver to shift the driving mode to manual driving or when it is estimated that the driver is not in a state in which manual driving is performed, the mode determiner 150 performs a control process of causing the host vehicle M to be stopped at a target position according to automated driving and stopping (ending) the automated driving after the host vehicle M is stopped. After the automated driving is stopped, the host vehicle M is in the state of mode D or E and the host vehicle M can be started according to the manual operation of the driver. Hereinafter, the same is true for "stopping of automated driving."

In mode B, when the driver is not monitoring the front, the mode determiner 150 prompts the driver to monitor the surroundings using the HMI 30 and performs a control process of causing the host vehicle M to be stopped at the target position and stopping the automated driving if the driver does not respond. When the driver is not monitoring the front in mode C or is not gripping the steering wheel 82, the mode determiner 150 prompts the driver to monitor the surroundings and/or grip the steering wheel 82 using the HMI 30 and performs a control process of causing the host vehicle M to be stopped at a target position and stopping automated driving if the driver does not respond. In modes C and D, when the lane change is not executed while the host vehicle M reaches a prescribed point, a control process of causing the host vehicle M to be stopped at the target position and stopping automated driving may be performed.

The driver state determiner 152 determines whether or not the driver is in a state suitable for driving. For example, the driver state determiner 152 monitors the state of the driver so that the above-described mode is executed and determines whether or not the state of the driver is a state according to the task. For example, the driver state determiner 152 performs a posture estimation process by analyzing an image captured by the driver monitor camera 70 and determines whether or not the driver is in a posture in which the driving mode cannot be shifted to manual driving in response to a request from the system. The driver state determiner 152 performs a line-of-sight estimation process by analyzing the image captured by the driver monitor camera 70 and determines whether or not the driver is monitoring the surroundings (more specifically, the front) of the host vehicle M. When it is determined that the state is not a state according to the task for a prescribed time period or more, the driver state determiner 152 determines that the driver is in a state unsuitable for driving of the task. When it is determined that the state is a state according to the task, the driver state determiner 152 determines that the driver is in a state suitable for driving of the task. The driver state determiner 152 may determine whether or not the driver is in a state in which the driving can be changed.

The surrounding environment determiner 154 determines whether or not the surrounding environment of the host vehicle M satisfies prescribed conditions for executing the target driving mode. The prescribed conditions are, for example, the presence or absence of other vehicles (including a preceding vehicle), a type of traveling road (an expressway or a passing lane), whether the mode is an executable mode, whether there is a merge point, a branch point, a toll gate, or the like, whether or not there is a change in a speed limit of a traveling lane due to construction work, another road situation, or the like, and the like.

The vehicle state determiner 156 determines a traveling state of the host vehicle M. The traveling state of the host vehicle M includes, for example, a current driving mode of the host vehicle M, a traveling distance of the host vehicle M in the same lane, a traveling time period, a position and a speed of the host vehicle M on the road, and the like. The traveling state of the host vehicle M may include the presence or absence of the intention of a lane change by the driver, an ON state of a winker, a timing when the intention of the lane change has been detected, a timing when the winker has been turned on, a position where a lane change to an adjacent lane has been completed, and the like. The vehicle state determiner 156 may acquire content of prescribed information output to the HMI 30 by the HMI controller 170 and information about an output timing.

The mode determiner 150 determines the driving mode of the host vehicle M on the basis of determination results of the driver state determiner 152, the surrounding environment determiner 154, and the vehicle state determiner 156. The mode determiner 150 determines whether or not a driving mode having a milder task imposed on the driver than a current driving mode is executable on the basis of the determination results of the driver state determiner 152, the surrounding environment determiner 154, and the vehicle state determiner 156. When it is determined that the above-described driving mode is executable, the mode determiner 150 causes acceleration/deceleration control of the host vehicle M to be executed by the action plan generator 140 and the second controller 160 in accordance with the condition for switching to the above-described driving mode. The mode determiner 150 asks the driver about whether or not to switch the driving mode in a state in which the host vehicle M is at a speed at which the driving mode can be switched to the above-described driving mode and determines to switch the driving mode to the above-described driving mode when a mode switching instruction (approval) from the driver has been received.

The mode change processor 158 performs various types of processes for making a change to the mode determined by the mode determiner 150. For example, the mode change processor 158 causes the HMI controller 170 to control the HMI 30 so that the driver is prompted to perform a prescribed operation, issues an instruction for generating a target trajectory for stopping the automated driving, or issues an operation instruction to a driving assistance device (not shown). When it is determined that a driving mode having a milder task imposed on the driver than the current driving mode is executable, the mode change processor 158 causes acceleration/deceleration control of the host vehicle M or the like to be executed for switching to the mode. When an instruction (approval) for switching the driving mode of the host vehicle M to a prescribed mode has been received using the mode changeover SW 36A, the mode change processor 158 executes various types of processes for executing the mode.

The second controller 160 controls the travel driving force output device 200, the brake device 210, and the steering device 220 so that the host vehicle M passes along the target trajectory generated by the action plan generator 140 at the scheduled times. The second controller 160 includes, for example, an acquirer 162, a speed controller 164, and a steering controller 166. The acquirer 162 acquires information of a target trajectory (trajectory points) generated by the action plan generator 140 and causes a memory (not shown) to store the information. The speed controller 164 controls the travel driving force output device 200 or the brake device 210 on the basis of a speed element associated with the target trajectory stored in the memory. The steering controller 166 controls the steering device 220 in accordance with a degree of bending of the target trajectory stored in the memory. The processes of the speed controller 164 and the steering controller 166 are implemented by, for example, a combination of feedforward control and feedback control. As an example, the steering controller 166 executes feedforward control according to the curvature of the road in front of the host vehicle M and feedback control based on a deviation from the target trajectory in combination.

The HMI controller 170 notifies the driver of the host vehicle M of prescribed information using the HMI 30. The prescribed information includes, for example, driving assistance information. For example, the HMI controller 170 may generate an image including the above-described prescribed information and cause the display device of the HMI 30 to display the generated image or may generate speech indicating the prescribed information and cause the generated speech to be output from the speaker of the HMI 30. The HMI controller 170 may output the information received by the HMI 30 to the communication device 20, the navigation device 50, the first controller 120, and the like.

The travel driving force output device 200 outputs a travel driving force (torque) for enabling the host vehicle M to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 160 or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operation element 80 so that brake torque according to a braking operation is output to each wheel. The brake device 210 may include a mechanism configured to transfer the hydraulic pressure generated according to an operation on the brake pedal included in the driving operation elements 80 to the cylinder via a master cylinder as a backup. The brake device 210 is not limited to the above-described configuration and may be an electronically controlled hydraulic brake device configured to control an actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the steering wheel 82 of the driving operation element 80 to change the direction of the steerable wheels.

[Regarding Driving Control Before and After Mode Switching]

Hereinafter, driving control before and after mode switching in the first embodiment will be specifically described. Hereinafter, examples of driving control before and after switching from mode B to mode A (an independent automated driving mode) will be described separately. Hereinafter, information output from the HMI 30 under the control of the HMI controller 170 at the time of mode switching will also be described. Hereinafter, it is assumed that the driver state determiner 152 determines a state suitable for driving before and after mode switching as the driver's state. In the following description, the term "the host vehicle M reaches a point P" indicates that, for example, a reference point (for example, a front end) of the host vehicle M reaches a line extending from the point P on the road in the road width direction.

<First Driving Control>

Figure 4:
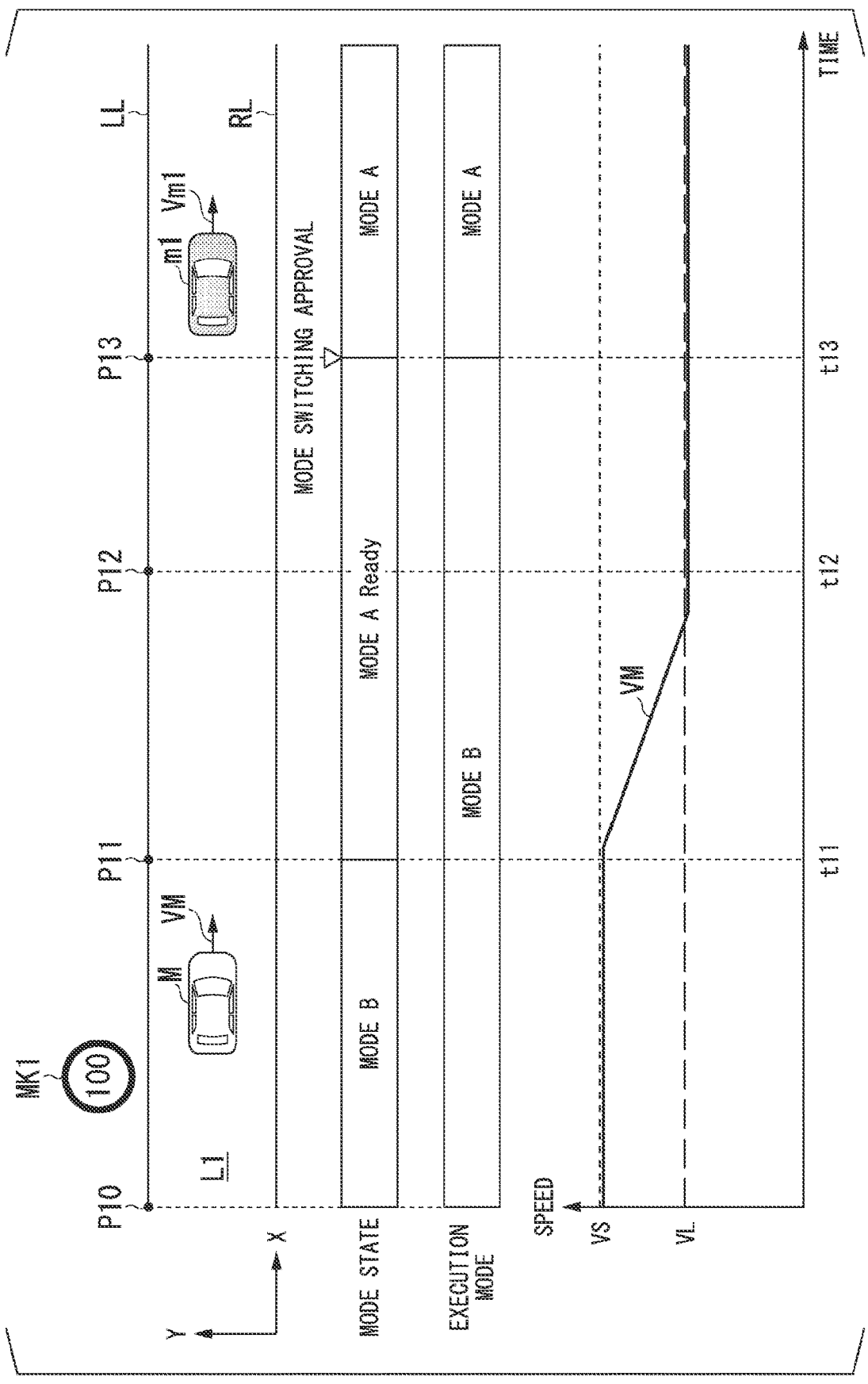
FIG. 4 is a diagram for describing first driving control before and after mode switching.

FIG. 4 is a diagram for describing first driving control before and after mode switching. In the example of FIG. 4, a state of a speed change according to the host vehicle M traveling in a lane L1 partitioned by road markings RL and LL at a speed VM, a mode state during traveling, an execution mode of the host vehicle M, and the elapse of time before and after mode switching is shown. The mode state is, for example, information about a mode that is being executed and an executable mode. The execution mode is, for example, a driving mode being executed in the host vehicle M. In the example of FIG. 4, it is assumed that the X-axis direction is a traveling direction of the lane L1 and the Y-axis direction is substantially a width direction of the lane L1. In the example of FIG. 4, it is assumed that the lane L1 is an expressway and the speed limit (a maximum speed or an upper limit speed) based on a legal speed is 100 [km/h]. In the lane L1, 50 [km/h] may be set as a minimum speed (a lower limit speed) based on the legal speed. The speed information may be acquired from a road sign MK1 or the like installed near the lane L1 included in the image captured by the camera 10 or may be acquired from road information corresponding to position information with reference to map information (the second map information 62) on the basis of the position information of the host vehicle M. It is assumed that a preceding vehicle (an example of another vehicle) m1 is traveling in front of the host vehicle M at a speed of Vm1. In the example of FIG. 4, it is assumed that the host vehicle M does not track the preceding vehicle m1. In the example of FIG. 4, it is assumed that time t11 is earliest and time t12 and t13 are increasingly later than time t11 in that order.

In road sections P10 to P11 shown in FIG. 4, the host vehicle M travels in mode B. In mode B, the automated driving controller 100 generates a target trajectory so that a speed VM of the host vehicle M becomes a set speed VS (for example, 120 [km/h]) set by the speed setting SW 36B and causes the host vehicle M to travel along the generated target trajectory by performing acceleration/deceleration control. Here, the term "the speed VM becomes the speed of OO" may indicate that, for example, a speed error between the speed VM and the speed of OO is less than a threshold value and the speed VM does not exceed the speed of OO (or is less than or equal to the speed of OO). The speed of OO includes, for example, the set speed VS, a target speed, a speed limit VL, or the like.

For example, the mode determiner 150 determines that the state is a state in which mode A is executable (a ready state for mode A) when only some of a plurality of conditions for switching to mode A (specifically, an independent automated driving mode) are not satisfied, but the other conditions are satisfied. The plurality of conditions for switching to mode A include, for example, the following conditions (A) to (F) (a traveling environment), but other conditions may be included therein and these may be replaced with other conditions.

(A) The traveling lane of the host vehicle M can be recognized at a first prescribed distance or more.

(B) There are no obstacles within a second prescribed distance from the host vehicle M.

(C) There is no execution prohibited section for mode A (for example, a merge point, a branch point, a toll gate, or a construction section) within a third prescribed distance from the host vehicle M.

(D) The host vehicle M is traveling in a traveling lane (an expressway) at a constant speed (a constant prescribed speed error may be included) for a prescribed distance or more or a prescribed time period or more.

(E) A mode switching instruction (approval) has been received from the driver.

(F) The speed of the host vehicle M becomes the target speed.

Some conditions are, for example, the conditions (E) and (F). The target speed in the above-described condition (F) is, for example, a speed within the legal speed of the traveling lane of the host vehicle M, and, specifically, is a speed set in a speed range from the minimum speed to the maximum speed (the speed limit) of the traveling lane. In the case of the lane L1, the target speed is set at 50 to 100 [km/h]. Hereinafter, it is assumed that the target speed is the speed limit (the maximum speed) VL.

When it is determined that mode A is executable at a timing (time t11) when the host vehicle M has reached the point P11, the mode change processor 158 causes the action plan generator 140 to generate a target trajectory for performing deceleration control and causes the host vehicle M to travel along the target trajectory so that the speed VM of the host vehicle M becomes a target speed for switching the mode to mode A from the set speed VS (or does not exceed the speed limit (the maximum speed)).

The HMI controller 170 causes the HMI 30 to output information indicating that mode A is executable and information indicating that vehicle control for switching to mode A (for example, acceleration/deceleration control) is performed from time t11 to the time when the speed VM of the host vehicle M becomes the speed limit VL or less. In this case, the HMI controller 170 may cause the display device 32 to display an image showing the various types of information described above or may cause speech indicating the various types of information to be output from the speaker 34.

Hereinafter, as an example in which the various types of information are output to the HMI 30, an example in which an image is displayed on the display device 32 will be described.

Figure 5:
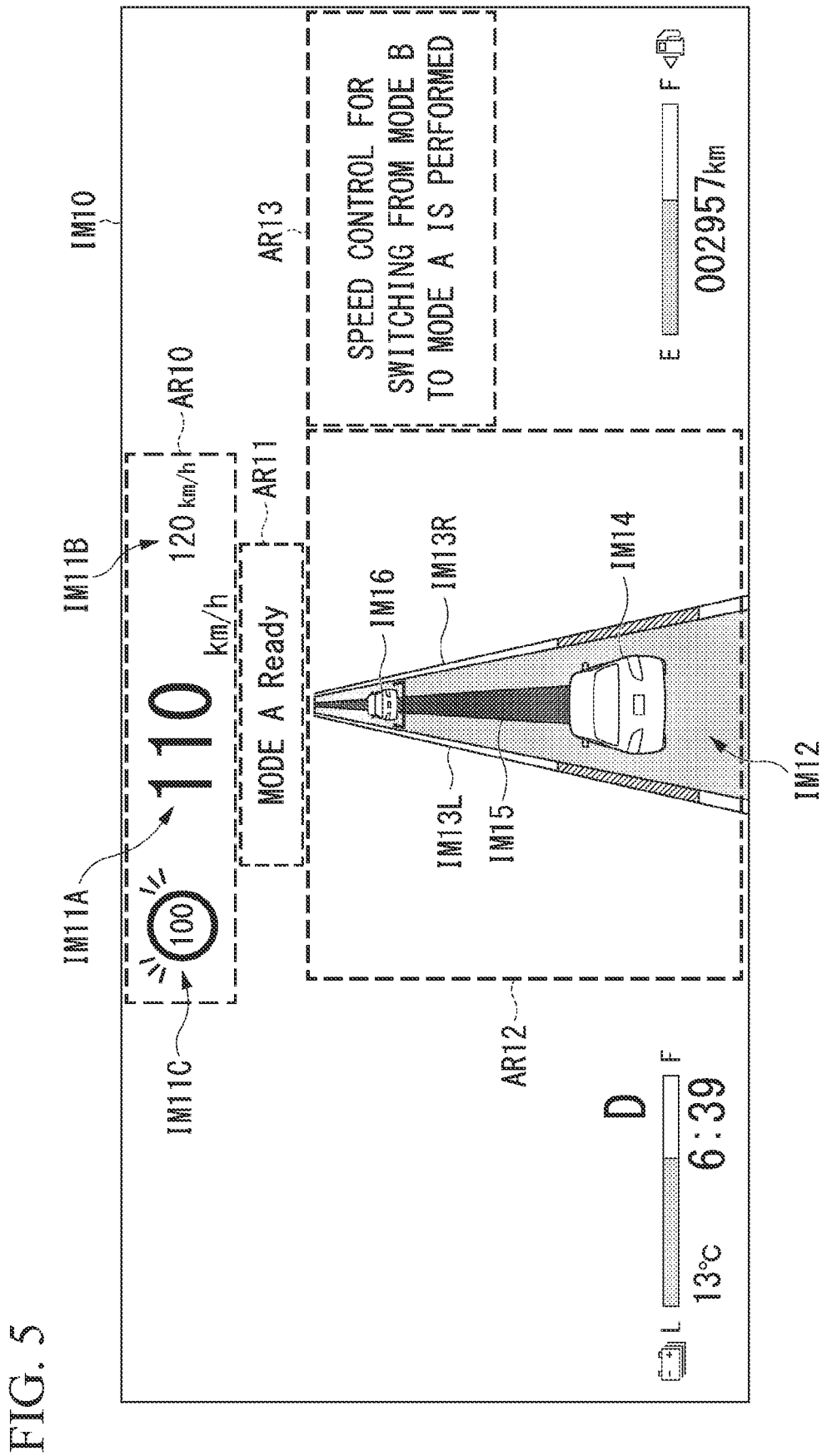
FIG. 5 is a diagram showing an example of an image showing that mode A is executable and that deceleration control for switching to mode A will be performed.

FIG. 5 is a diagram showing an example of an image IM10 showing that mode A is executable and that deceleration control for switching to mode A will be performed. The image IM10 includes, for example, a speed information display area AR10, a mode state display area AR11, a surrounding situation display area AR12, and a notification content display area AR13. The content, layout, and the like displayed on the image IM10 are not limited to the example of FIG. 5. The same is true for examples of other images to be described below.

In the speed information display area AR10, for example, an image IM11A showing the speed VM of the host vehicle M detected by the vehicle sensor 40 or the like, an image IM11B showing the set speed VS of the host vehicle M, and an image IM11C showing the speed limit VL are displayed. The HMI controller 170 may cause the image IM11C showing the speed limit VL to be displayed in a display mode different from those of the image IM11A and the image IM11B. The display mode includes, for example, a color, a shape, a pattern, gradation, the presence/absence of blinking, the presence/absence of an animated image, and the like. In the example of FIG. 5, only the image IM11C among the images IM11A to IM11C displayed in the speed information display area AR10 is blinked and highlighted. Thereby, the driver can easily ascertain that the host vehicle M is performing deceleration control toward the set speed VS.

An image showing the mode state is displayed in the mode state display area AR11. In the example of FIG. 5, in the mode state display area AR11, the text "Mode A Ready" indicating a state in which mode A is executable while mode B is being executed is displayed. When the state is not a state in which mode A is executable, text such as "mode B" is displayed. Detailed information of the mode (for example, a "TJP mode of mode A," an "ACC mode of mode B," or the like) may be displayed in the mode state display area AR11. The information displayed in the mode state display area AR11 can allow the driver to ascertain the state of the host vehicle M accurately.

A first layer image IM12 imitating the lane L1 is displayed in the surrounding situation display area AR12. The first layer image IM12 may include second layer images IM13L and IM13R imitating the road markings LL and LR that partition the lane L1. The first layer image IM12 may include, for example, another lane (for example, an adjacent lane, a branch point, or an interchange lane). In the surrounding situation display area AR12, a third layer image IM14 imitating the host vehicle M is superimposed and displayed on the first layer image IM12 in correspondence with the position of the traveling lane in which the host vehicle M is actually present. For example, when the host vehicle M is executing LKAS, a part or both of second layer images IM13L and IM13R may be displayed in a display mode indicating that each road marking can be recognized. The display mode includes, for example, a color, a shape, a pattern, gradation, the presence/absence of blinking, the presence/absence of an animated image, and the like. In the example of FIG. 5, some areas on the left and right of a display position of the third layer image IM14 between the second layer images IM13L and IM13R are displayed in a display mode different from those of the others. Thereby, it is possible to notify the occupant that the host vehicle M recognizes the road markings LL and LR.

In the surrounding situation display area AR12, a fourth layer image IM15 imitating the future target trajectory of the host vehicle M generated by the action plan generator 140 is displayed in a display mode capable of being distinguished from that of the first layer image IM12. In the surrounding situation display area AR12, when there is another vehicle near the host vehicle M, a fifth layer image IM16 imitating the other vehicle may be displayed. In this case, the fifth layer image IM16 is displayed at a position associated with the third layer image IM14 on the basis of a relative position between the host vehicle M and the other vehicle.

In the notification content display area AR13, an image for notifying the occupant of the state of the host vehicle M and/or an image for prompting the driver to execute a prescribed operation are displayed. In the example of FIG. 5, a text image indicating that "Speed control for switching from mode B to mode A is being performed" is displayed as information indicating that the speed control of the host vehicle M is performed so that the mode is switched from mode B to mode A. Thereby, the driver can accurately confirm the reason why the host vehicle M has decelerated. Information according to the execution conditions of each mode, such as "Please monitor the surroundings in the correct posture" and "Please grip the steering wheel," may be displayed in the notification content display area AR13.

In the image IM10 (including the images IM20 to IM30 to be described below), in addition to the image displayed in the above-described areas, an image showing other driving assistance information (for example, a shift state of the host vehicle M, the remaining amount of energy, and a driving mode) and other information (for example, an outside temperature and a time point) may be included.

Next, the mode change processor 158 causes the HMI controller 170 to output information for suggesting that the driver cause the host vehicle M to travel in mode A to the HMI 30 when the host vehicle M has traveled in the lane L1 for a prescribed distance or more or a prescribed time period or more and at a timing when the speed VM of the host vehicle M has reached the speed limit VL (time t12 or a timing when the host vehicle M has reached a point P12). The above-described information may include information for asking the driver about whether or not to execute mode A.

Figure 6:
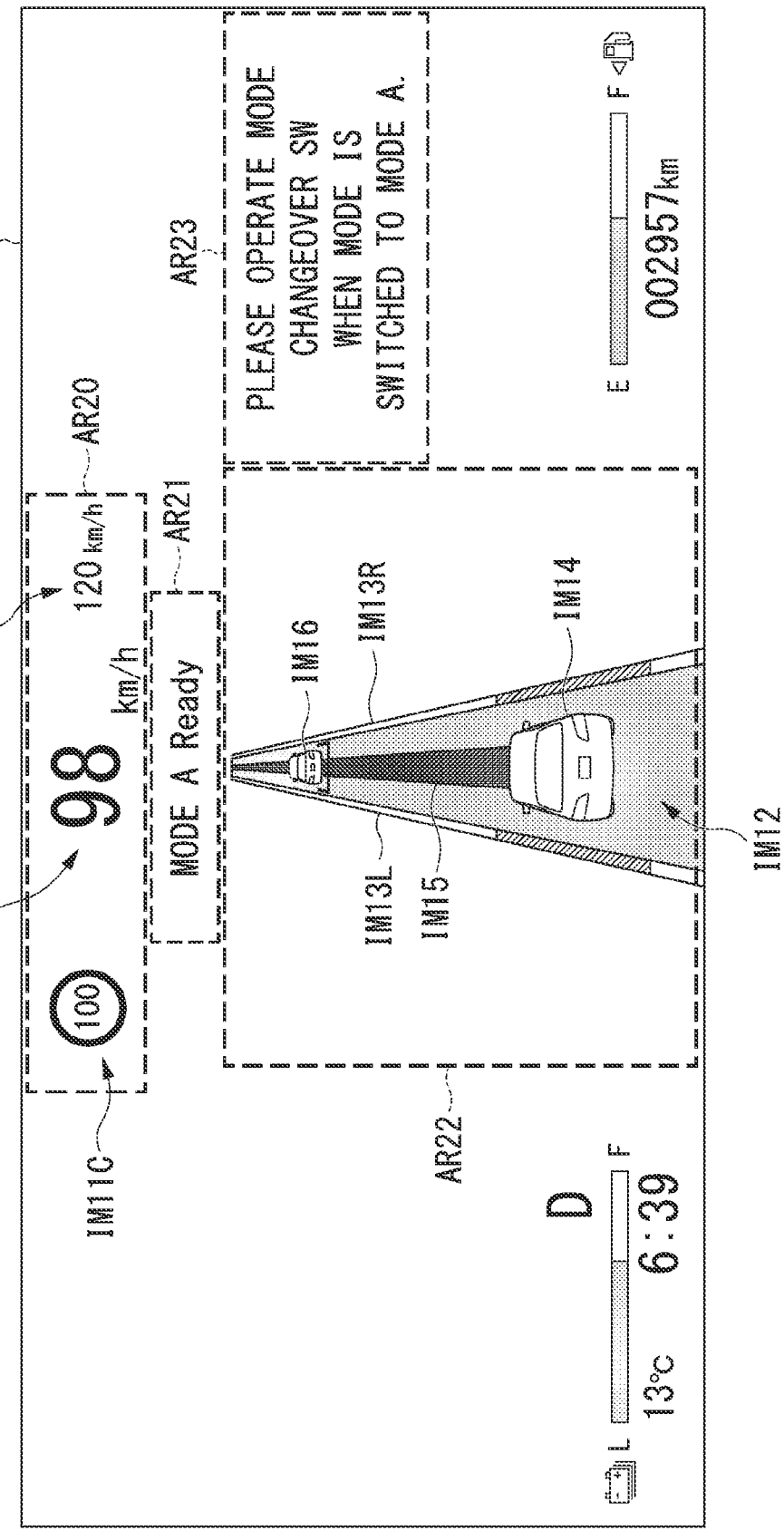
FIG. 6 is a diagram showing an example of an image including information for suggesting that the driver perform traveling in mode A.

FIG. 6 is a diagram showing an example of an image IM20 including information for suggesting that the driver perform traveling in mode A. The image IM20 includes, for example, a speed information display area AR20, a mode state display area AR21, a surrounding situation display area AR22, and a notification content display area AR23. Images IM11A to IM11C are displayed in the speed information display area AR20 as in the speed information display area AR10. In a scene where the image IM20 is displayed, because the speed VM of the host vehicle M becomes less than or equal to the speed limit VL, the HMI controller 170 causes the image IM11C to be displayed in a display mode thereof without blinking.

The displayed content and display modes in the mode state display area AR21 and the surrounding situation display area AR22 are similar to the displayed content and display modes in the mode state display area AR11 and the surrounding situation display area AR12 included in the above-described image IM10. In the example of FIG. 6, information for prompting the driver to perform traveling in mode A as information for suggesting that the driver cause the host vehicle M to travel in mode A is shown in the notification content display area AR23. In the example of FIG. 6, a text image for notifying the driver that the mode changeover SW 36A needs to be operated at the time of switching to mode A is displayed in the notification content display area AR23. The mode change processor 158 switches the mode to mode A at a timing when the operation for approving the mode switching by the driver has been received by the mode changeover SW 36A (time t13 or a timing when the point P13 has been reached). In this case, the HMI controller 170 may cause an image indicating that the driving mode is mode A to be displayed in the mode state display area AR21 and may cause a text image showing the term "Mode A will be executed," "Mode A is being executed," or the like to be displayed in the notification content display area AR23.

After time t13, the driving controller executes the driving control so that the state satisfying the execution conditions of mode A (for example, the above-described conditions (A) to (F)) is continued. Therefore, for example, when the speed limit VL has changed due to road construction, weather, other road situations, and the like (for example, when the speed limit VL has changed from 100 [km/h] to 80 [km/h]), the driving controller performs speed control so that the speed VM of the host vehicle M becomes the changed speed limit VL and continues mode A. In this case, the HMI controller 170 may cause the HMI 30 to output information indicating that the speed control for continuing mode A is being performed. When the execution condition cannot be satisfied according to the driving control such as when an execution prohibited section for mode A is present within a third prescribed distance, the mode determiner 150 switches the mode to another appropriate mode.

<Second Driving Control>

Figure 7:
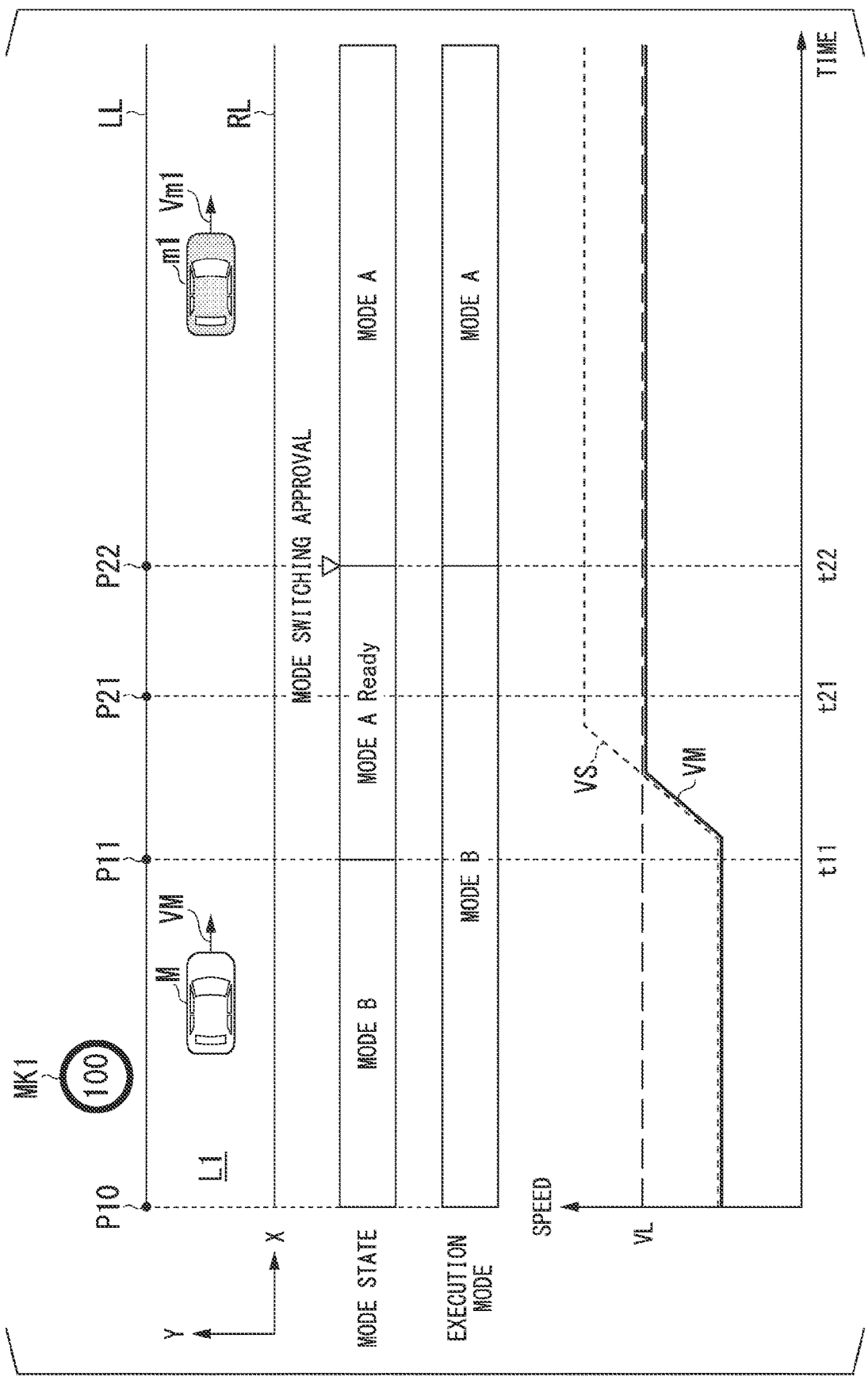
FIG. 7 is a diagram for describing second driving control before and after mode switching.

FIG. 7 is a diagram for describing second driving control before and after mode switching. The second driving control is different from the first driving control in that the set speed VS is less than the speed limit (the maximum speed) VL in a section where the mode state is mode B. In this case, the set speed VS is assumed to be greater than the minimum speed of the lane L1. In the second driving control, an example in which the driver increases the set speed VS of the host vehicle M to a speed greater than the speed limit VL by operating the speed setting SW 36B in a state in which mode A is executable is shown. In the example of FIG. 7, it is assumed that the time is later in the order of t11, t21, and t22. Hereinafter, differences from the first driving control will be mainly described.

In the example of FIG. 7, when it is determined that mode A is executable at a timing (time t11) when the host vehicle M has reached the point P11, the mode change processor 158 causes the action plan generator 140 to generate a target trajectory for performing acceleration control so that the speed VM of the host vehicle M changes from the set speed VS to the target speed (specifically, the speed limit or less) for switching to mode A and causes the host vehicle M to travel along the target trajectory.

While the speed VM of the host vehicle M is being increased from time t11, the HMI controller 170 causes the display device 32 to display the image IM10 showing that mode A is executable and vehicle control (for example, acceleration/deceleration control) for switching to mode A is performed.

When the driver increases the set vehicle speed VS using the speed setting SW 36B, the mode change processor 158 causes the speed VM of the host vehicle M to increase as the set speed VS increases. When the set speed VS exceeds the speed limit VL, the mode change processor 158 executes speed control so that the speed VM of the host vehicle M does not exceed the speed limit VL.

Subsequently, at the timing when the speed VM of the host vehicle M becomes the speed limit VL and the state continues for a prescribed distance or more or a prescribed time or more (time t21 or a timing when the host vehicle M has reached a point P21), the mode change processor 158 causes the HMI controller 170 to output the image IM20 for asking the driver about whether or not to execute mode A to the HMI 30. The mode change processor 158 switches the mode to mode A at a timing when an operation for approving the mode switching by the driver has been received using the mode changeover SW 36A (time t22 or a timing when the host vehicle M has reached a point P22). In this case, the HMI controller 170 may cause an image indicating that the driving mode is mode A to be displayed in the mode state display area AR21 and cause a text image showing the term "Mode A will be executed," "Mode A is being executed," or the like to be displayed in the notification content display area AR23.

In the second driving control, the host vehicle M is already traveling at a speed that does not exceed the speed limit VL at a timing (time t11) when the host vehicle M has reached a point P11. Therefore, the mode change processor 158 may cause the HMI controller 170 to output the image IM20 for asking the driver about whether or not to execute mode A to the HMI 30 without performing the speed control at time t11 and receive a mode switching instruction (approval) from the driver.

<Third Driving Control>

Figure 8:
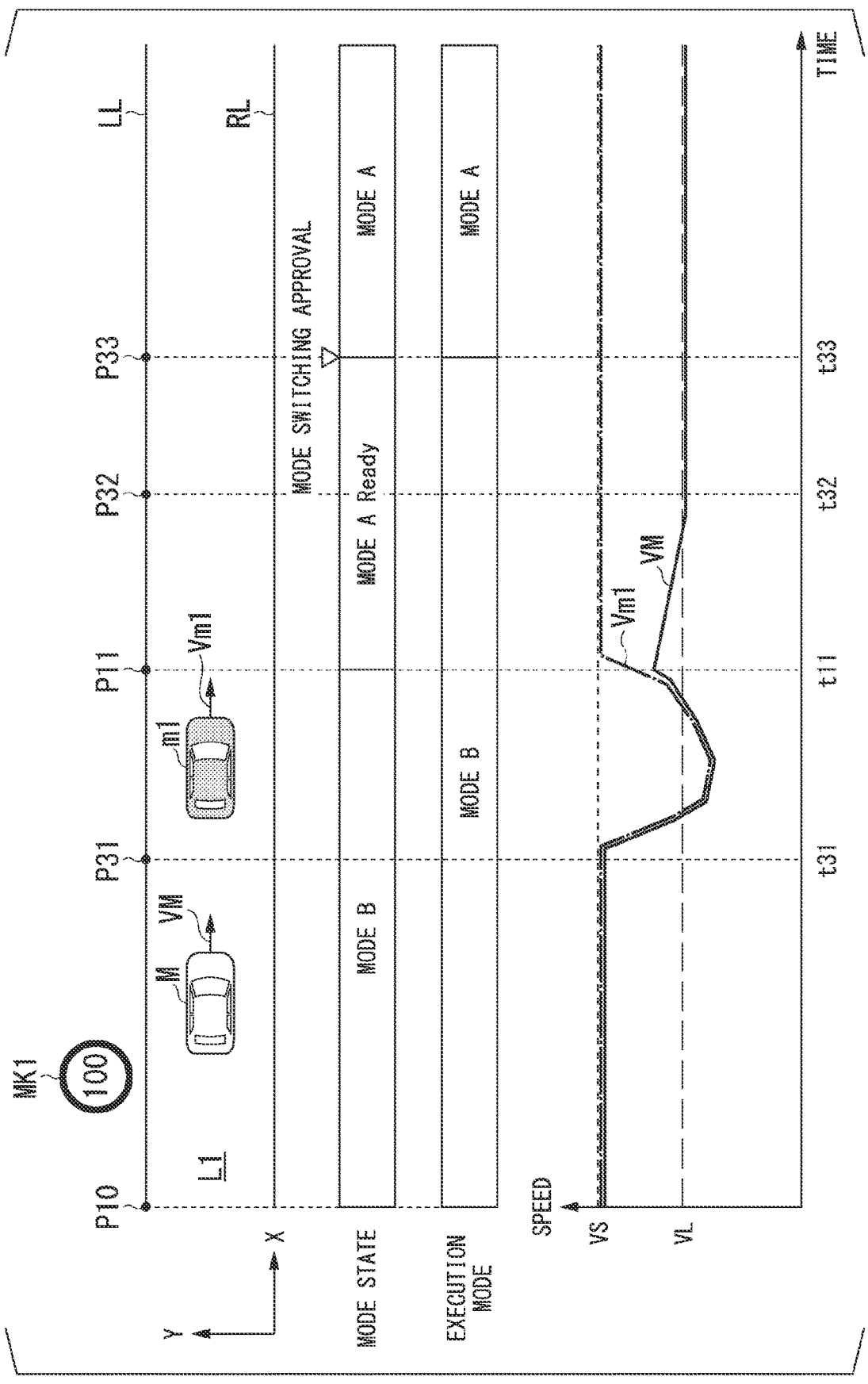
FIG. 8 is a diagram for describing third driving control before and after mode switching.

FIG. 8 is a diagram for describing third driving control before and after mode switching. The third driving control is driving control before and after the mode is switched to mode A (the independent automated driving mode) from an execution state of an ACC mode in which an inter-vehicle distance between the host vehicle M and the preceding vehicle ml is constantly maintained in mode B. In the example of FIG. 8, it is assumed that time t31 is earliest and time t11, t32, and t33 are increasingly later than time 31 in that order.

In the third driving control, the driving controller adjusts the speed VM of the host vehicle M in correspondence with the speed Vm1 of the preceding vehicle ml so that the distance between the host vehicle M and the preceding vehicle ml becomes a prescribed distance. Here, when the speed Vm1 of the preceding vehicle ml decreases at a timing (time t31) when the host vehicle M has reached a point P31, the speed VM of the host vehicle M is also decelerated on the basis of a decreasing amount and the speed VM is increased on the basis of an increasing amount when the speed Vm1 increases (time t31 to t11 in FIG. 8).

It is assumed that the host vehicle M is in a state in which mode A is executable at a timing (time t11) when the host vehicle M has reached a point P11. In this case, the mode change processor 158 causes deceleration control to be executed so that the speed VM of the host vehicle M becomes less than or equal to the speed limit VL of the lane L1. In the example of FIG. 8, because the speed of the other vehicle ml also increases and the other vehicle ml travels at a speed higher than the speed limit VL when the host vehicle M is subjected to deceleration control, a distance from the host vehicle M increases and consequently the host vehicle M travels alone. While the speed control of the host vehicle M is being performed (between times t11 and t32), the HMI controller 170 causes the display device 32 to display the image IM10 shown in FIG. 5.

The mode change processor 158 causes the HMI controller 170 to output the image IM20 for asking the driver about whether or not to execute mode A to the HMI 30 at a timing when the speed VM of the host vehicle M becomes less than or equal to the speed limit VL and a state thereof continues for a prescribed distance or more or a prescribed time period or more (time t32 or a timing when the host vehicle M has reached a point P32).

The mode change processor 158 switches the mode to mode A at a timing when an operation in which the driver approves the mode switching has been received by the mode changeover SW 36A (time t33 or a timing when the host vehicle M has reached a point P33).

As described above, according to the third driving control, even if the host vehicle M is traveling in the ACC mode in mode B, it is possible to cause the host vehicle M to travel in the independent automated driving mode by switching the mode of the host vehicle M to mode A.

<Fourth Driving Control>

Figure 9:
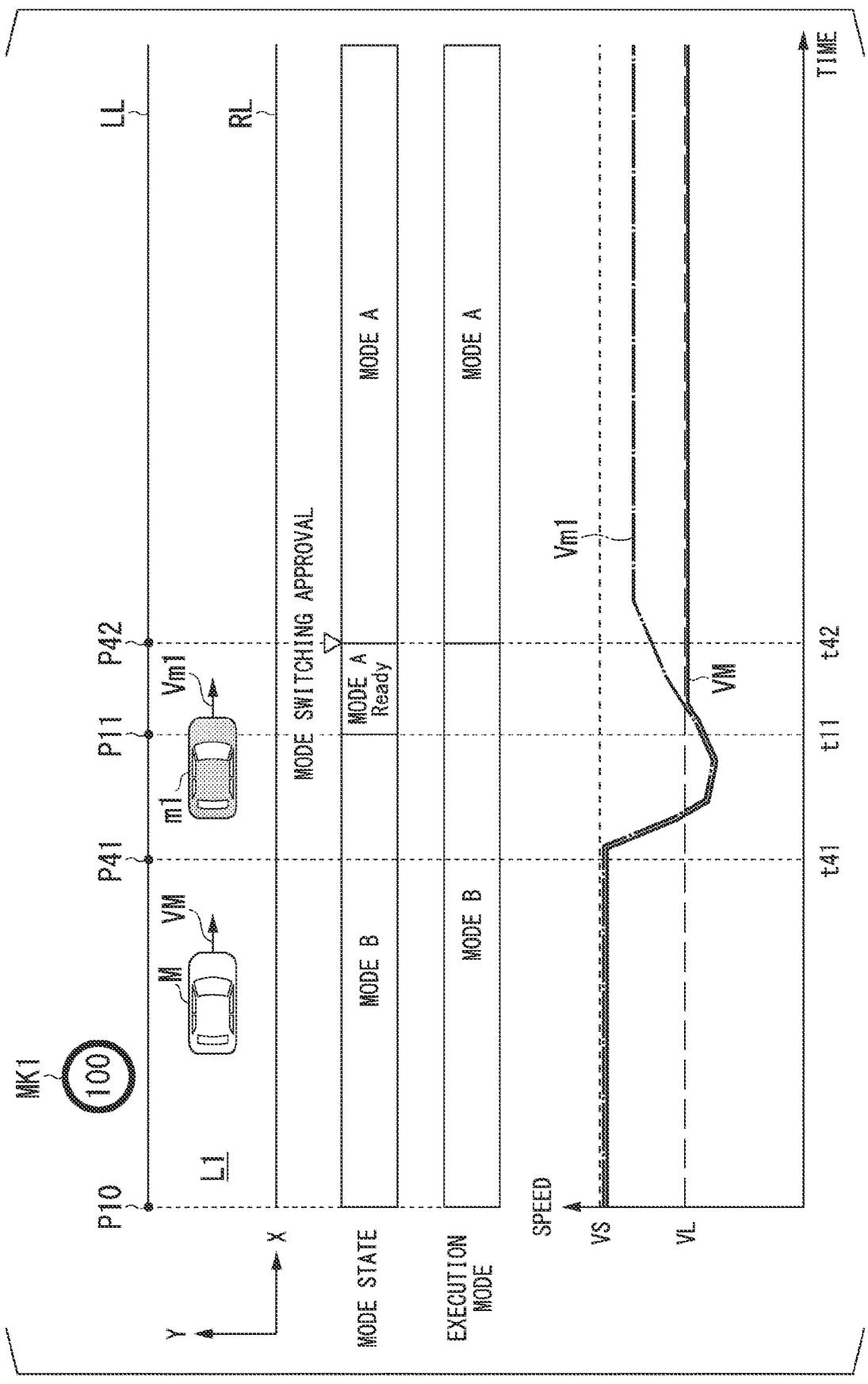
FIG. 9 is a diagram for describing fourth driving control before and after mode switching.

FIG. 9 is a diagram for describing fourth driving control before and after mode switching. The fourth driving control is different from the third driving control in that mode A is executable in a situation where the speed VM of the host vehicle M is less than the speed limit VL. Hereinafter, the above-described difference will be mainly described. In the example of FIG. 9, it is assumed that time t41 is earliest and time t11 and t42 are increasingly later than time t41 in that order.

In the fourth driving control, the driving controller adjusts the speed VM of the host vehicle M in correspondence with the speed Vm1 of the preceding vehicle ml so that a distance between the host vehicle M and the preceding vehicle ml becomes a prescribed distance. Here, the speed VM of the host vehicle M is also decelerated on the basis of a decreasing amount when the speed Vm1 of the preceding vehicle ml has decreased at a timing (time t41) when the host vehicle M has reached a point P41 and the speed VM is increased on the basis of an increasing amount when the speed Vm1 has increased (time t41 to t11 in FIG. 8).

It is assumed that the host vehicle M is in a state in which mode A is executable at a timing (time t11) when the host vehicle M has reached the point P11. In this case, the mode change processor 158 causes acceleration control to be executed so that the speed VM of the host vehicle M becomes the speed limit VL of the lane L1. In this case, the driving controller adjusts the speed VM of the host vehicle M so that the preceding vehicle ml is tracked on the basis of the speed Vm1 of the preceding vehicle ml until the speed Vm1 of the preceding vehicle ml exceeds the speed limit VL and adjusts the speed VM of the host vehicle M so that the speed VM becomes less than or equal to the speed limit VL at a timing when the speed Vm1 of the preceding vehicle ml exceeds the speed limit VL. The mode determiner 150 switches the mode to mode A at a timing when the speed VM becomes less than or equal to the speed limit VL and a state thereof has continued for a prescribed distance or more or a prescribed time period or more (time t42 or a timing when the host vehicle M has reached a point P42).

In the first embodiment, as shown in the above-described first to fourth driving control, it is possible to more appropriately execute driving control in which tasks imposed on the driver are mild under various situations. In each of the types of the first to fourth driving control, the mode determiner 150 may limit the execution (switching) of mode A, for example, when the minimum speed (the lower limit speed) is set in the traveling lane (the lane L1) of the host vehicle M and the speed VM of the host vehicle M is less than the minimum speed of the lane L1. Thereby, it is possible to limit traffic congestion due to a low speed. When the minimum speed is set in the lane L1 and the speed VM of the host vehicle M becomes less than the minimum speed after mode A is executed, the mode determiner 150 may continue mode A. Thereby, it is possible to prevent mode A from being frequently switched due to acceleration/deceleration. It is possible to make a change from the independent automated driving mode to the TJP mode while continuing mode A.

[Processing Flow of First Embodiment]

Figure 10:
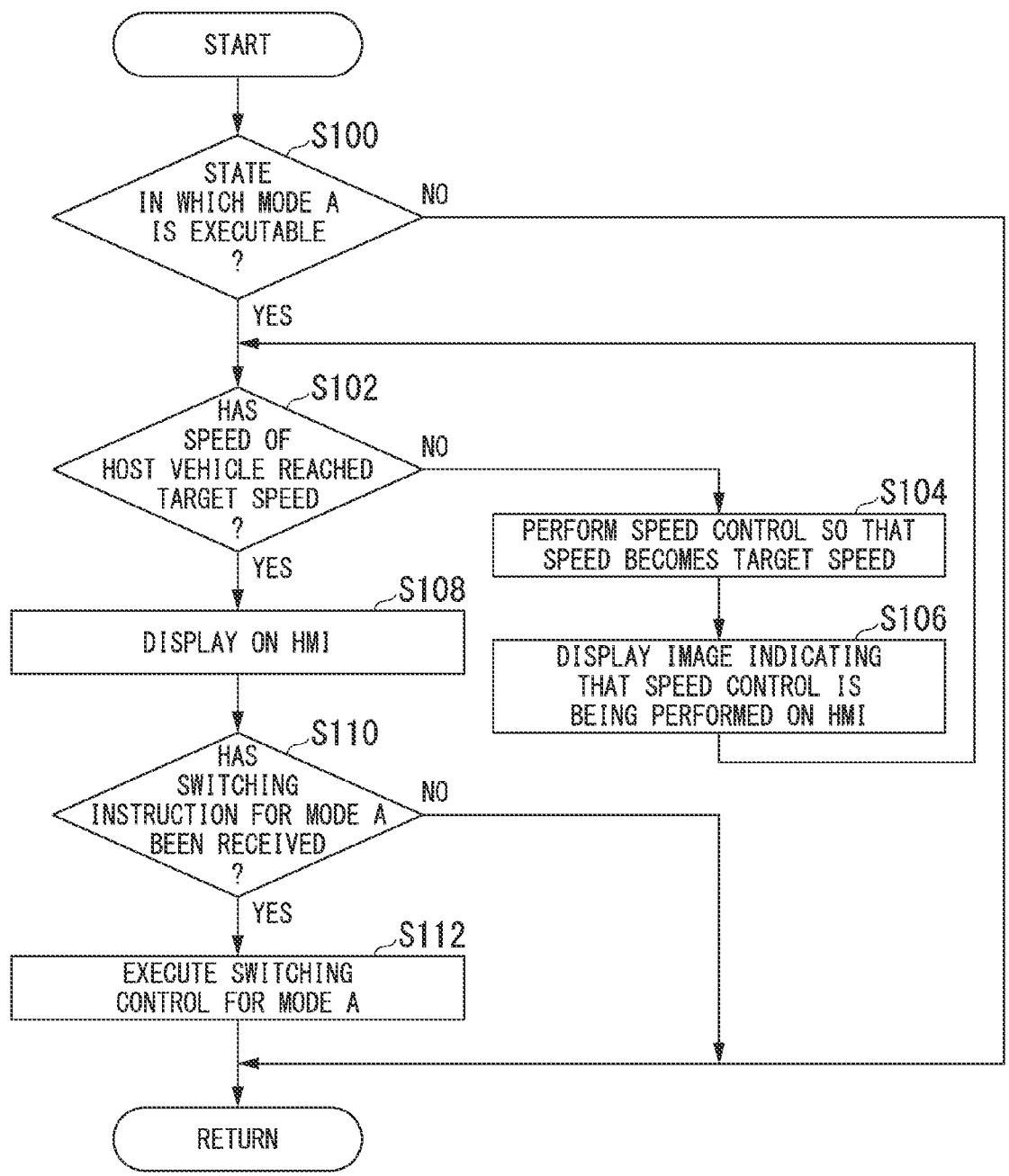
FIG. 10 is a flowchart showing an example of a flow of a process executed by an automated driving controller of the first embodiment.

FIG. 10 is a flowchart showing an example of a flow of a process executed by the automated driving controller 100 of the first embodiment. In the example of FIG. 10, a mode switching process from mode B to mode A among processes executed by the automated driving controller 100 will be mainly described. The process shown in FIG. 10 may be iteratively executed under a situation in which a prescribed condition such as during execution of driving control is satisfied.

In the example of FIG. 10, the mode determiner 150 determines whether or not the host vehicle M is in a state in which mode A is executable (a ready state for mode A) on the basis of determination results of the driver state determiner 152, the surrounding environment determiner 154, and the vehicle state determiner 156 (step S100). When it is determined that the host vehicle M is in a state in which mode A is executable, the mode determiner 150 determines whether or not the speed VM of the host vehicle M has reached a target speed (step S102). When it is determined that the speed VM of the host vehicle M has not reached the target speed, the action plan generator 140 controls the speed of the vehicle M so that the speed VM of the host vehicle M becomes the target speed (step S104). Subsequently, the HMI controller 170 causes the display device 32 to display an image (for example, an image IM10) showing that mode A is executable and that the host vehicle M is performing speed control (vehicle control) to switch the mode (step S106). After the processing of step S106, the process returns to the processing of step S102.

When the mode determiner 150 determines that the speed VM of the host vehicle M has reached the target speed in the processing of step S106, the HMI controller 170 causes the HMI 30 to display an image (for example, an image IM20) for asking the driver about whether or not to execute mode A (step S108). In the processing of S108, when it is determined that the speed VM of the host vehicle M has reached the target speed, the control of switching to mode A may be executed if the host vehicle M has traveled for a prescribed distance or more or a prescribed time period or more from traveling in the traveling lane in a state in which the speed of the host vehicle M has become the target speed.

Subsequently, the mode determiner 150 determines whether or not a mode switching instruction has been received according to an operation on the mode changeover SW 36A by the driver (step S110). When it is determined that a switching instruction specific to mode A has been received, the mode determiner 150 determines to execute mode A and executes the switching control for mode A (step S112). Thereby, the process of the present flowchart ends.

When it is determined that the host vehicle M is not in a state in which mode A is executable in the processing of step S100 or when it is determined that the switching instruction specific to mode A has not been received at a point in time when the vehicle M has traveled a prescribed distance or within a prescribed time period after a display process in the HMI 30 in the processing of step S110, the process of the present flowchart ends. In this case, the driving controller continuously executes mode B currently being executed.

According to the above-described first embodiment, for example, it is possible to start mode A immediately on the basis of an intention of the driver to switch the mode by performing vehicle control for switching to mode A when the host vehicle M can execute the driving control in mode A and then switching the mode to mode A when an instruction (approval) for switching to mode A has been received from the driver. By notifying the driver of information indicating the state of the host vehicle M, it is possible to limit the driver's feelings of anxiety and more appropriately execute driving control in which the task imposed on the driver is mild.

Second Embodiment

Next, a driving control device according to a second embodiment will be described. The driving control device according to the second embodiment is different from the first embodiment in that a mode of a host vehicle M can be switched and control is performed so that a speed VM becomes a target speed according to an operation of a driver. The driver's operation is, for example, that the driver operates a driving operation element 80 (a manual driving operation). The driver's operation may include an operation on a speed setting SW 36B by the driver. Hereinafter, the above-described differences will be mainly described. Because a configuration similar to that of the vehicle system 1 of the first embodiment is applied to a vehicle system according to the second embodiment, description will be given using the vehicle system 1 even in the second embodiment. Even in the second embodiment, as in the first embodiment, an example of switching from mode B to mode A (an independent automated driving mode) will be described.

Figure 11:
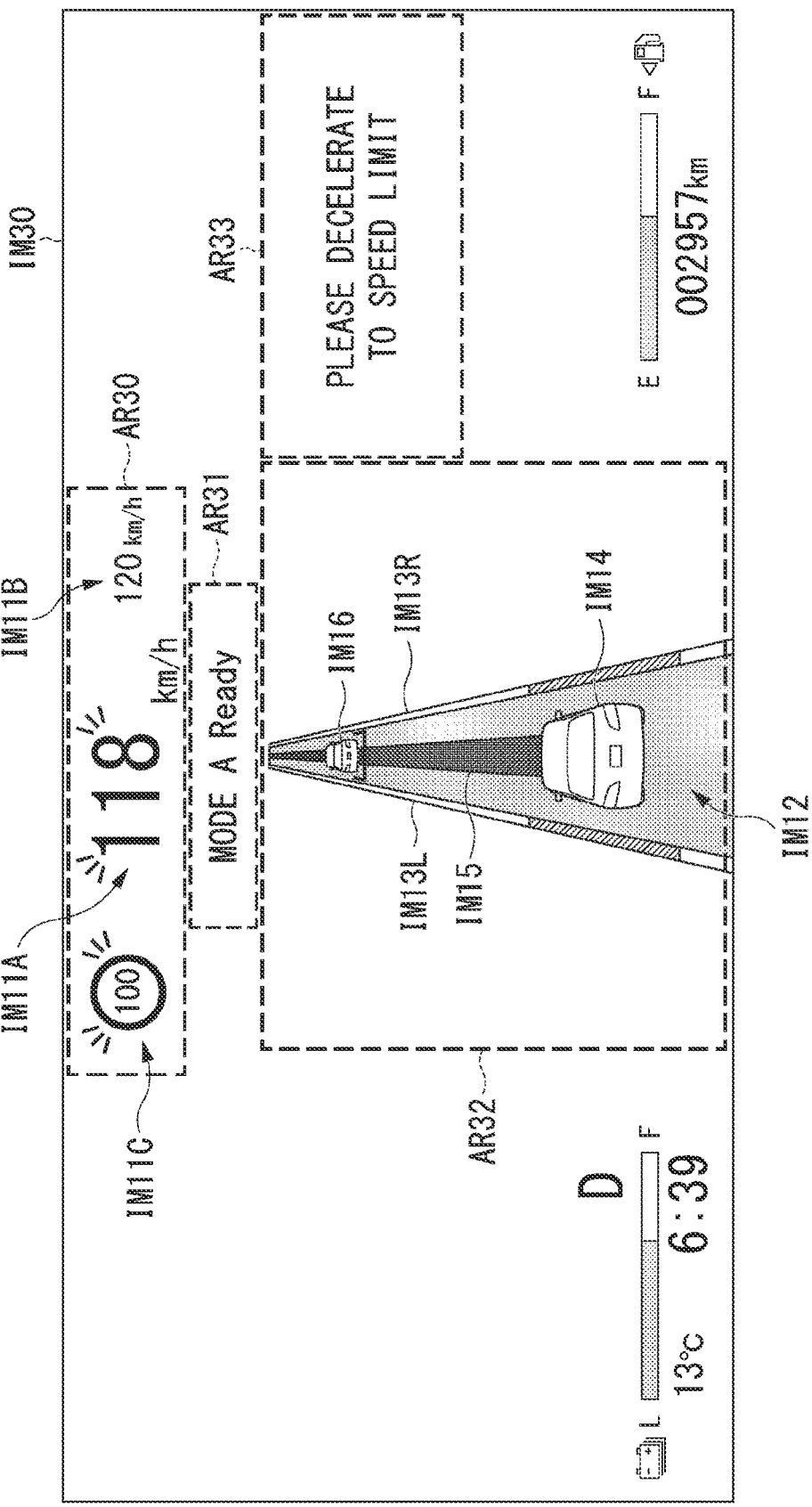
FIG. 11 is a diagram showing an example of an image for showing that mode A is executable and prompting the driver to adjust the speed of the host vehicle M according to an operation of the driver.

In the second embodiment, a mode determiner 150 determines whether or not the host vehicle M is in a state in which mode A is executable on the basis of determination results of a driver state determiner 152, a surrounding environment determiner 154, and a vehicle state determiner 156. When the host vehicle M is in a state in which mode A is executable, an HMI controller 170 causes an HMI 30 to output information for indicating that mode A is executable and prompting the driver to adjust the speed of the host vehicle M. FIG. 11 is a diagram showing an example of an image IM30 for indicating that mode A is executable and promoting the driver to adjust the speed of the host vehicle M according to the driver's operation. The image IM30 includes, for example, a speed information display area AR30, a mode state display area AR31, a surrounding situation display area AR32, and a notification content display area AR33.

Information similar to that in a speed information display area AR10, a mode state display area AR11, and a surrounding situation display area AR12 included in an image IM10 is displayed in the speed information display area AR30, the mode state display area AR31, and the surrounding situation display area AR32. The HMI controller 170 causes an image IM11A showing a speed VM of the host vehicle M and an image IM11C showing a speed limit VL displayed in the speed information display area AR30 to be displayed in a display mode different from that of an image IM11B showing a set speed VS. In the example of FIG. 11, the images IM11A and IM11C are displayed with blinking in an image IM30 and the image IM11B are displayed without blinking. In the notification content display area AR33, an image for prompting the driver to adjust the speed so that the speed VM of the host vehicle M becomes less than or equal to the speed limit VL is displayed. In the example of FIG. 11, in the notification content display area AR33, a text image indicating the term "Please decelerate to the speed limit" or the like is displayed. Thereby, it is possible for the driver to ascertain that the driver needs to control the speed (acceleration/deceleration control) of the host vehicle M by himself/herself.

After the image IM30 is displayed, the driver performs speed control based on manual driving by operating a brake pedal, an accelerator pedal, or the like included in the driving operation element 80 or performs speed control of the host vehicle M by performing an adjustment process so that a traveling speed becomes a speed limit by operating the speed setting SW 36B. When the mode determiner 150 determines that the speed VM of the host vehicle M has reached the speed limit, the HMI controller 170 causes a display device 32 to display the image IM10. When the mode switching instruction (approval) has been received by the mode changeover SW 36A, the mode determiner 150 switches the driving mode of the host vehicle M from mode B to mode A.

The switching control in the second embodiment is similarly executed under the situations shown in the first to fourth driving control in the above-described first embodiment. In the second embodiment, instead of the operation of the speed setting SW 36B by the driver, another switch (for example, a resume switch) related to the speed adjustment of the host vehicle M may be operated. The resume switch is, for example, a switch that receives an execution instruction of speed control so that the speed of the host vehicle M becomes the set vehicle speed set previously.

[Processing Flow of Second Embodiment]

Figure 12:
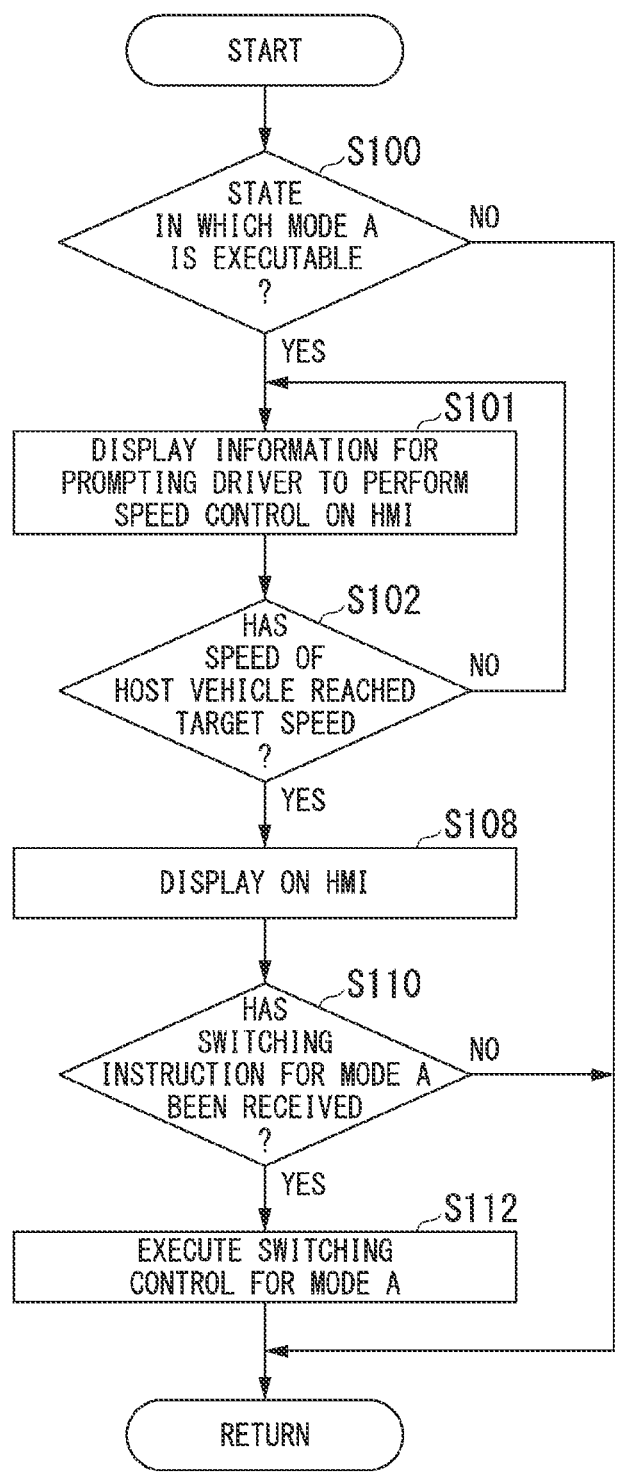
FIG. 12 is a flowchart showing an example of a flow of a process executed by an automated driving controller of a second embodiment.

FIG. 12 is a flowchart showing an example of a flow of a process executed by the automated driving controller 100 of the second embodiment. In the example of FIG. 12, as compared with a process of switching the mode to mode A (steps S100 to S112) in the above-described first embodiment, there is a difference in that the processing of step S101 is provided between steps S100 and S102 instead of the processing of steps S104 to S106. Therefore, the processing of step S101 will be mainly described below.

When it is determined that the state is a state in which mode A is executable in the processing of step S100, the HMI controller 170 causes the HMI 30 to display an image (for example, the image IM30) for indicating that mode A is executable and prompting the driver to control the speed of the host vehicle M (step S101). Next, the mode determiner 150 determines whether or not the speed VM of the host vehicle M has reached a target speed (step S102). When it is determined that the speed VM of the host vehicle M has not reached the target speed, the process returns to the processing of step S101. When it is determined that the speed VM of the host vehicle M has reached the target speed, the HMI controller 170 causes the display device 32 of the HMI 30 to display an image (for example, an image IM20) for asking the driver about whether or not to execute mode A (step S108) and executes the processing from step S110.

When the speed of the host vehicle M has not reached the target speed even though the host vehicle M continuously traveled for a prescribed time period or more or a prescribed distance or more in the processing of step S102 after the display of the image IM30 in the processing of step S101, the process of the present flowchart may end. In the second embodiment, it may be determined that the mode determiner 150 has acquired the intention of the occupant to switch the mode when the driver has adjusted the set speed VS after the display of the image IM30 on the HMI 30. In this case, when the host vehicle M has continuously traveled for a prescribed distance or more or a prescribed time period or more in a state in which the host vehicle M has reached the target speed, the mode determiner 150 may execute the control of switching to mode A without the display of an image for asking the driver about whether or not to execute mode A and regardless of whether or not an operation on the mode changeover SW 36A has been received. Thereby, it is possible to simplify the content of an operation by the driver and execute the control of switching to mode A.

According to the above-described second embodiment, in addition to effects similar to those of the first embodiment, it is possible to switch the mode by controlling a speed of the host vehicle M according to an operation of the driver and more appropriately acquiring an intention of the driver to switch the mode.

Third Embodiment

Next, a driving control device according to a third embodiment will be described. The driving control device according to the third embodiment is different from that of the first embodiment in that acceleration/deceleration control for switching to mode A and a process of sending an inquiry to a driver are performed after a lane change from a passing lane to a lane (a traveling lane or a slow lane) other than the passing lane when a host vehicle M is traveling in the passing lane. Therefore, the above-described differences will be described below. Because a configuration of a vehicle system according to the third embodiment is similar to that of the vehicle system 1 of the first embodiment, description will be given using the vehicle system 1 in the third embodiment. In the third embodiment, as in the first embodiment, an example in which the mode is switched from mode B to mode A (an independent automated driving mode) will be described.

Figure 13:
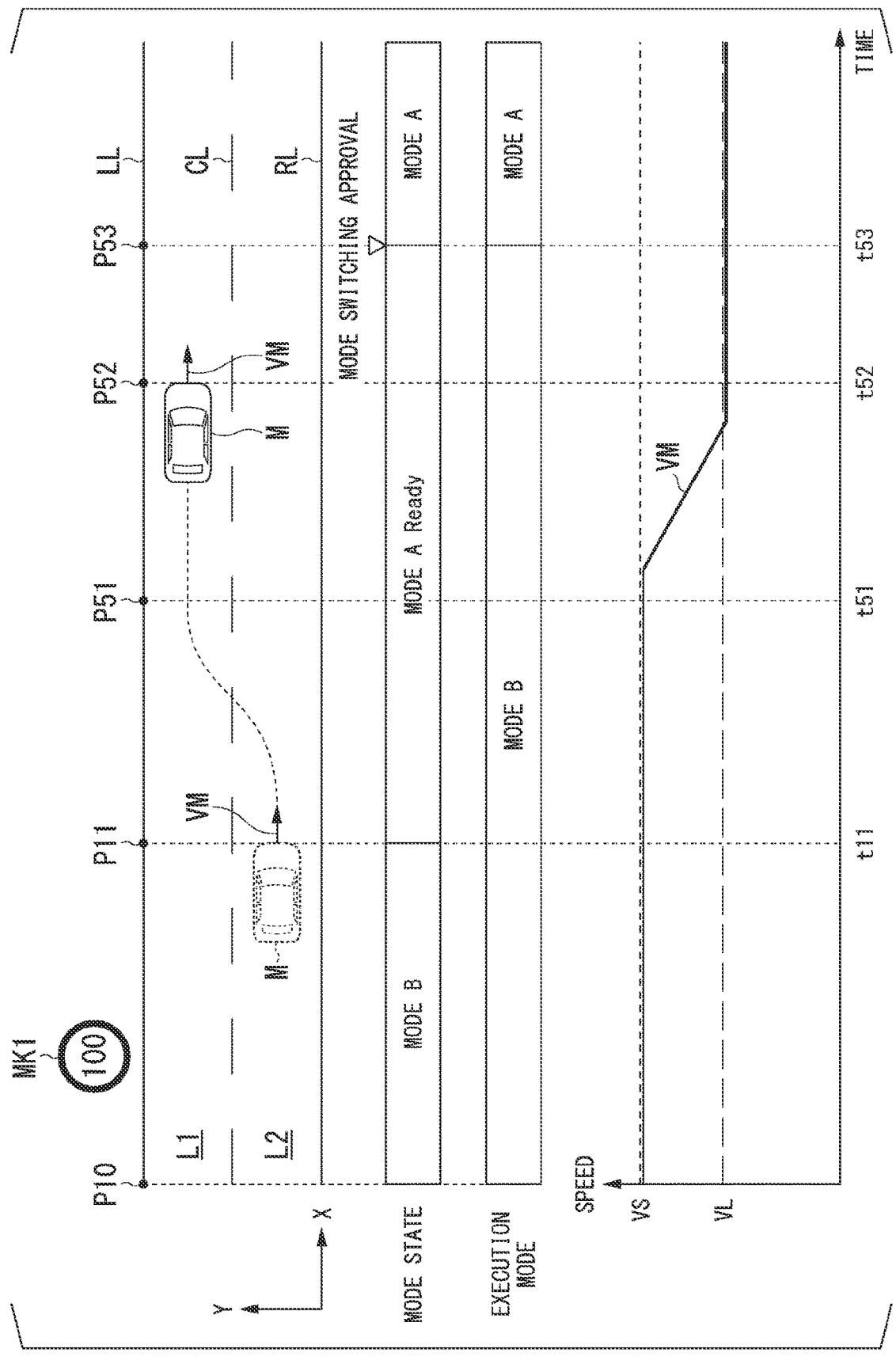
FIG. 13 is a diagram for describing driving control before and after mode switching according to a third embodiment.

FIG. 13 is a diagram for describing driving control before and after mode switching according to the third embodiment. In the example of FIG. 13, as in the above-described first driving control, a scene in which a set speed VS is greater than a speed limit VL and the mode is switched by decelerating the speed after the mode switching is approved is shown. The driving control according to the third embodiment can also be applied to each of the types of second to fourth driving control. In the example of FIG. 13, a road of two lanes L1 and L2 in which traveling is possible in the same direction (an X-axis direction) is shown. The lane L1 is partitioned by road markings LL and CL and the lane L2 is partitioned by road markings CL and RL. It is assumed that the lane L1 is a traveling lane (a slow lane) and the lane L2 is a passing lane. The road marking CL is a marking indicating that the lane change can be made between the lanes L1 and L2. In the example of FIG. 13, it is assumed that the time is later in the order of times t11, t51, t52, and t53. It is assumed that the host vehicle M is traveling in the passing lane at a time point before time t11 when it is determined that mode A is executable.

In the third embodiment, the mode determiner 150 determines whether or not the vehicle M is in a state in which mode A is executable on the basis of determination results of a driver state determiner 152, a surrounding environment determiner 154, and a vehicle state determiner 156. For example, when the mode determiner 150 determines that mode A is executable at a timing (time t11) when the host vehicle M has reached a point P11, the surrounding environment determiner 154 determines whether the lane L2 in which the host vehicle M is traveling is a passing lane or a traveling lane (a lane other than the passing lane). Specifically, the surrounding environment determiner 154 determines whether or not the lane in which the host vehicle M is traveling is a passing lane from a road sign included in an image on the basis of a captured image analysis result from the camera 10. The surrounding environment determiner 154 may determine whether or not the host vehicle M is traveling in the passing lane according to which lane the host vehicle M is traveling in among a plurality of lanes included in the road. In this case, the surrounding environment determiner 154 may determine that the host vehicle M is traveling in the passing lane when the host vehicle M is traveling in the rightmost lane among a plurality of lanes in which traveling is possible in the same direction, for example, on a road to which the left-hand traffic regulation is applied, or determine that the host vehicle M is traveling in the traveling lane (a lane other than the passing lane) when the host vehicle M is traveling in a lane other than the rightmost lane.

The surrounding environment determiner 154 may determine whether or not the lane corresponding to a position of the host vehicle M is the passing lane with reference to the map information on the basis of position information of the host vehicle M.

When it is determined that the traveling lane of the host vehicle M is the passing lane, the mode determiner 150 controls the action plan generator 140 so that the host vehicle M is allowed to make a lane change (ALC) from the lane L2 to the lane L1 that is the traveling lane. When the lane change is made, the HMI controller 170 may cause the HMI 30 to output information indicating that the lane change is being made so that the mode is switched to mode A.

Subsequently, the mode determiner 150 performs speed control so that the speed VM of the host vehicle M becomes the target speed (the speed limit VL) at a timing when the lane change to the lane L1 has been completed (time t51 or a timing when the host vehicle M has reached a point P51). The term "the lane change to the lane L1 is completed" may indicate, for example, a state in which the center of the vehicle M (or the center of gravity) is traveling in the center of the lane L1 or a state in which all wheels of the host vehicle M are within the lane L1.

In relation to the mode determiner 150, the HMI controller 170 causes a display device 32 to display an image IM20 at a timing when a state in which the speed VM of the host vehicle M is constant at the speed limit VL or less has continued for a prescribed time period or more or a prescribed distance or more (time t52 or a timing when the host vehicle M has reached a point P52).

Subsequently, when the mode switching instruction has been received in the mode changeover SW 36A at a timing (time t53) when the host vehicle M has reached a point P53, a control process of switching the driving mode of the host vehicle M to mode A is performed. Thereby, it is possible to limit the congestion of the passing lane because the deceleration for switching to mode A is not performed in the passing lane.

In the above-described example, the mode determiner 150 may make a lane change to the lane L1 after the host vehicle M first decelerates to a target speed in the lane L2 under a situation in which deceleration control is performed after the host vehicle M makes the lane change from the lane L2 to the lane L1, but there is no vehicle following the host vehicle M. The mode determiner 150 may make a lane change from the lane L2 to the lane L1 while deceleration control is performed. For example, the mode determiner 150 may adjust a timing when speed control is performed on the basis of a surrounding situation of the host vehicle M, an instruction of the occupant, and the like.

In the third embodiment, the mode determiner 150 causes one or both of the lane change and the deceleration to be executed according to an operation of the driver instead of executing the lane change and the speed control on the vehicle system 1 side. In this case, the HMI controller 170 causes the HMI 30 to output information for executing one or both of the lane change and the deceleration according to the operation of the driver. The mode determiner 150 switches the mode to mode A after one or both of the lane change to the lane L1 and deceleration that have been indicated are executed according to the operation of the driver.

In the lane change control according to the third embodiment, when the lane change from the passing lane L2 to the traveling lane L1 cannot be made due to the congestion of the lane L1 or the road situation such as a situation in which construction is in progress, the mode determiner 150 may cause the current mode (mode B) to continue without switching to mode A. For example, the mode determiner 150 determines that the lane change from the passing lane L2 to the traveling lane L1 cannot be made when the number of times ALC for the lane L1 has failed is greater than or equal to a prescribed number or when ALC has not been completed even though the host vehicle M traveled a prescribed distance or more after the reception of the approval of switching to mode A by the driver.

When the switching to mode A is stopped because the lane cannot be changed, the HMI controller 170 causes the HMI 30 to display a text image indicating "The switching to mode A is stopped because the lane cannot be changed" or the like. Thereby, the driver can accurately ascertain the reason why the switching to mode A has been stopped.

[Processing Flow of Third Embodiment]

Figure 14:
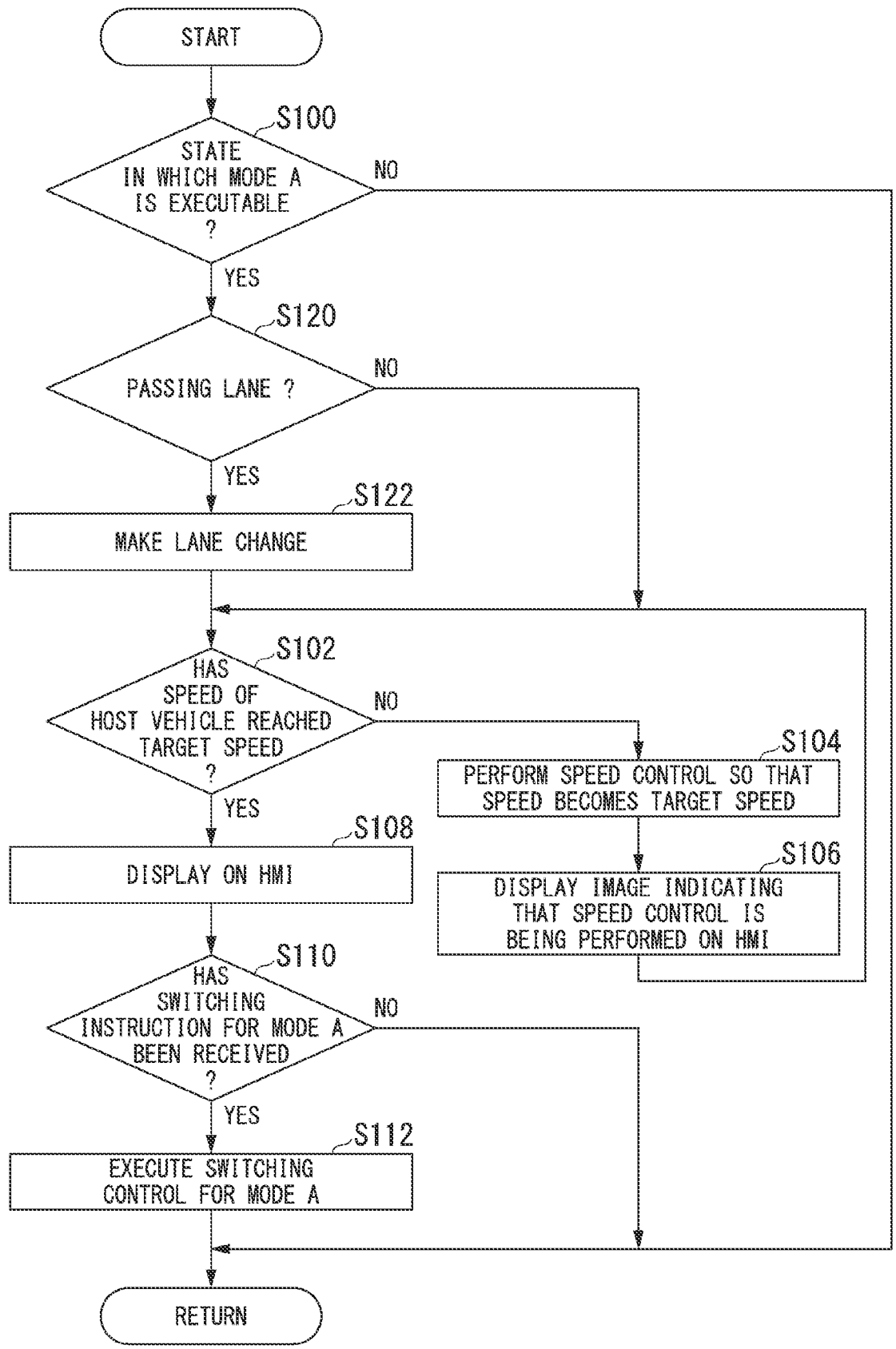
FIG. 14 is a flowchart showing an example of a flow of a process executed by an automated driving controller of the third embodiment.

FIG. 14 is a flowchart showing an example of a flow of a process executed by the automated driving controller 100 of the third embodiment. The third embodiment is different from the first embodiment in that the process shown in FIG. 14 includes the processing of steps S120 to S122 between steps S100 and S102 as compared with the process of switching to mode A (steps S100 to S112) in the first embodiment described above. Hereinafter, the processing of steps S120 to S122 will be mainly described. When it is determined that the state is a state in which mode A is executable in the processing of step S100, the surrounding environment determiner 154 determines whether or not the lane in which the host vehicle M is traveling is the passing lane (step S120). When it is determined that the lane is the passing lane, a lane change to the traveling lane is made (step S122). When the lane in which the host vehicle M is traveling is not the passing lane or after the processing of step S122, the processing similar to that of steps S102 to S112 in the first embodiment is executed.

According to the third embodiment described above, in addition to effects similar to those of the first embodiment, it is possible to limit traffic congestion or the like in the passing lane by adjusting the speed and performing control for switching to mode A or accepting the approval of the driver after the lane change to a lane other than the passing lane. Therefore, more appropriate vehicle control can be performed in accordance with a situation.

MODIFIED EXAMPLES

Each of the above-described first to third embodiments may be a combination of some or all of the other embodiments. In each of the first to third embodiments, the mode determiner 150 may stop control for switching the mode and perform control for continuing mode B when an instruction for preventing the mode from being switched has been received from the driver in a state in which an image IM10 indicating that vehicle control for switching to mode A is performed shown in FIG. 5 or an image IM30 for prompting the driver to adjust the speed of the host vehicle M according to an operation of the driver shown in FIG. 11 has been displayed. Thereby, the system load can be reduced and the host vehicle M can be allowed to travel in the driving mode desired by the driver.

Although an operation on the mode changeover SW 36A is received after speed control is performed so that the speed of the host vehicle M becomes the target speed and the driving mode is switched from mode B (a first driving mode) to mode A (a second driving mode) in the first to third embodiments described above, the present invention is not limited to thereto. For example, when the mode is switched to mode A from a state in which the host vehicle M is traveling at a speed of 80 [km/h] in a lane of a speed limit of 100 [km/h] in the state of mode B, the mode may be switched to mode A only by operating the mode changeover SW 36A because traveling of 80 [km/h] is also possible in mode A. Whether or not to perform speed control for the above-described target speed may be set in advance by the occupant or may be set according to a situation of the host vehicle M, a surrounding situation, and the like. In the above-described plurality of conditions for switching to mode A, in place of (or in addition to) at least one of the above-described conditions (A) to (F), for example, a condition in which the speed VM of the host vehicle M is in a prescribed speed range (for example, 50 to 90 [km/h]) may be provided. In the first to third embodiments, when switching from mode B to mode A is performed, for example, the host vehicle M is decelerated from the current speed VM by a prescribed speed width (for example, 10 [km/h]) and then control such as the start of switching control may be performed.

According to the above-described embodiment, a vehicle control device includes the recognizer 130 configured to recognize a surrounding situation of the host vehicle M; a driving controller (the action plan generator 140 and the second controller 160) configured to control one or both of steering, acceleration, and deceleration of the host vehicle M on the basis of the surrounding situation recognized by the recognizer 130; and the mode changeover SW (an example of a first receiver) 36A configured to receive a switching operation on a driving mode of the vehicle by an occupant of the host vehicle M. The driving controller causes the host vehicle M to travel in any one of a plurality of driving modes including a first driving mode and a second driving mode in which a task imposed on the occupant of the host vehicle M is milder than that in the first driving mode. The driving controller can more appropriately execute speed control in which tasks imposed on the occupant are mild under various situations in which acceleration/deceleration control is performed so that a speed of the host vehicle M becomes a target speed in a state in which the first driving mode is being executed and the second driving mode is executable and the driving mode is switched from the first driving mode to the second driving mode when the first receiver has received an operation for switching the driving mode to the second driving mode in a state in which the speed has become the target speed.

Specifically, according to the above-described embodiment, it is possible to switch a mode at the more appropriate timing without performing speed control against an intention of a user by adjusting the speed of the host vehicle M at a timing when a driving mode in which a task imposed on the occupant is mild is executable and receiving an instruction (an intention) for switching the driving mode from the occupant to switch the mode when the speed has reached the executable target speed (for example, the speed limit). According to the above-described embodiment, for example, when the host vehicle M is traveling alone or performing tracking traveling on the expressway in mode B, the host vehicle M can be allowed to travel by switching the mode to mode A even if the host vehicle M is not under a TJP condition.

The embodiment described above can be represented as follows.

A vehicle control device including:
a storage device storing a program; and
a hardware processor,
wherein the hardware processor executes the program stored in the storage device to:
recognize a surrounding situation of a vehicle;
control one or both of steering, acceleration, and deceleration of the vehicle on the basis of the surrounding situation recognized by the recognizer;
receive a switching operation on a driving mode of the vehicle by an occupant of the vehicle;
cause the vehicle to travel in any one of a plurality of driving modes including a first driving mode and a second driving mode in which a task imposed on the occupant of the vehicle is milder than that in the first driving mode;
perform acceleration/deceleration control so that a speed of the vehicle becomes a target speed in a state in which the first driving mode is being executed and the second driving mode is executable; and
switch the driving mode from the first driving mode to the second driving mode when an operation for switching the driving mode to the second driving mode has been received in a state in which the speed has become the target speed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a recognizer configured to recognize a surrounding situation of a vehicle; a driving controller configured to execute a driving control one or both of steering, acceleration, and deceleration of the vehicle on the basis of the surrounding situation recognized by the recognizer; and
a first receiver configured to receive a switching operation on a driving mode of the vehicle by an occupant of the vehicle,
wherein the driving controller causes the vehicle to travel in any one of a plurality of driving modes including a first driving mode and a second driving mode in which a degree of automation of the driving control is higher than that in the first driving mode,
wherein the driving controller performs acceleration/deceleration control so that a speed of the vehicle becomes a target speed in a state in which the first driving mode is being executed and the second driving mode is executable and switches the driving mode from the first driving mode to the second driving mode when the first receiver has received an operation for switching the driving mode to the second driving mode in a state in which the speed has become the target speed,
wherein lanes in which the vehicle travels include a passing lane for passing a preceding vehicle, and
wherein the driving controller switches the driving mode from the first driving mode to the second driving mode when the vehicle is traveling in the passing lane in a state in which the vehicle is executing the first driving mode and the second driving mode is executable and when the first receiver has received an operation of switching the driving mode to the second driving mode after a lane change from the passing lane to a lane other than the passing lane was made and the speed of the vehicle became a target speed or after the speed of the vehicle became the target speed and then the lane change from the passing lane to the lane other than the passing lane was made.

2. The vehicle control device according to claim 1, wherein the driving controller switches the driving mode from the first driving mode to the second driving mode when the vehicle has traveled for a prescribed distance or more or a prescribed time period or more on an expressway and when the first receiver has received an operation of switching the driving mode to the second driving mode after the speed of the vehicle became the target speed.

3. The vehicle control device according to claim 1, further comprising an output controller configured to cause an output to output information about the driving mode, wherein the output controller causes the output to output information for suggesting that the occupant perform a process of causing the vehicle to travel in the second driving mode when the speed has become the target speed, and wherein the driving controller switches the driving mode from the first driving mode to the second driving mode when the first receiver has received an operation of switching the driving mode to the second driving mode after the information was output to the output.

4. The vehicle control device according to claim 1, wherein acceleration or deceleration to the target speed is performed according to speed control based on an operation of the occupant or speed control by the driving controller.

5. The vehicle control device according to claim 1, further comprising a second receiver configured to receive a set speed when the vehicle travels in the first driving mode, wherein the driving controller adjusts the speed of the vehicle on the basis of the set speed received by the second receiver.

6. The vehicle control device according to claim 3, wherein the output controller causes the output to output information for prompting the occupant to adjust the speed of the vehicle when control of the speed of the vehicle based on an operation of the occupant is performed.

7. The vehicle control device according to claim 5, wherein the driving controller switches the driving mode from the first driving mode to the second driving mode when the speed of the vehicle has become the target speed according to adjustment of the set speed.

8. The vehicle control device according to claim 1, wherein the target speed is a speed less than or equal to a legal speed of a traveling lane of the vehicle.

9. The vehicle control device according to claim 8, wherein the driving controller restricts execution of the second driving mode when a lower limit speed of the traveling lane is set and the speed of the vehicle is less than the lower limit speed of the traveling lane.

10. The vehicle control device according to claim 9, wherein the driving controller continues the second driving mode when the speed of the vehicle becomes less than the lower limit speed after the second driving mode is executed.

11. A computer-readable non-transitory storage medium storing a program for causing a computer to:

recognize a surrounding situation of a vehicle;

execute a driving control one or both of steering, acceleration, and deceleration of the vehicle on the basis of the surrounding situation recognized by the recognizer;

receive a switching operation on a driving mode of the vehicle by an occupant of the vehicle;

cause the vehicle to travel in any one of a plurality of driving modes including a first driving mode and a second driving mode in which a degree of automation of the driving control is higher than that in the first driving mode;

perform acceleration/deceleration control so that a speed of the vehicle becomes a target speed in a state in which the first driving mode is being executed and the second driving mode is executable;

switch the driving mode from the first driving mode to the second driving mode when an operation for switching the driving mode to the second driving mode has been received in a state in which the speed has become the target speed, wherein lanes in which the vehicle travels include a passing lane for passing a preceding vehicle; and switch the driving mode from the first driving mode to the second driving mode when the vehicle is traveling in the passing lane in a state in which the vehicle is executing the first driving mode and the second driving mode is executable and when the first receiver has received an operation of switching the driving mode to the second driving mode after a lane change from the passing lane to a lane other than the passing lane was made and the speed of the vehicle became a target speed or after the speed of the vehicle became the target speed and then the lane change from the passing lane to the lane other than the passing lane was made.

12. A vehicle control device comprising:

a recognizer configured to recognize a surrounding situation of a vehicle;

a driving controller configured to execute a driving control one or both of steering, acceleration, and deceleration of the vehicle on the basis of the surrounding situation recognized by the recognizer; and a second receiver configured to receive a set speed when the vehicle travels in a first driving mode, wherein the driving controller causes the vehicle to travel in any one of a plurality of driving modes including the first driving mode and a second driving mode in which a degree of automation of the driving control task is higher than that in the first driving mode, wherein the driving controller performs acceleration/deceleration control so that a speed of the vehicle becomes a target speed on the basis of the set speed received by the second receiver in a state in which the first driving mode is being executed and the second driving mode is executable and switches the driving mode from the first driving mode to the second driving mode when the speed has become the target speed, wherein lanes in which the vehicle travels include a passing lane for passing a preceding vehicle, and wherein the driving controller switches the driving mode from the first driving mode to the second driving mode when the vehicle is traveling in the passing lane in a state in which the vehicle is executing the first driving mode and the second driving mode is executable and when the first receiver has received an operation of switching the driving mode to the second driving mode after a lane change from the passing lane to a lane other than the passing lane was made and the speed of the vehicle became a target speed or after the speed of the vehicle became the target speed and then the lane change from the passing lane to the lane other than the passing lane was made.

13. A vehicle control method comprising:
recognizing, by a computer, a surrounding situation of a vehicle;
executing, by the computer, a driving control one or both of steering, acceleration, and deceleration of the vehicle on the basis of the surrounding situation recognized by the recognizer;
receiving, by the computer, a switching operation on a driving mode of the vehicle by an occupant of the vehicle;
causing, by the computer, the vehicle to travel in any one of a plurality of driving modes including a first driving mode and a second driving mode in which a degree of automation of the driving control is higher milder than that in the first driving mode;
performing, by the computer, acceleration/deceleration control so that a speed of the vehicle becomes a target speed in a state in which the first driving mode is being executed and the second driving mode is executable;
switching, by the computer, the driving mode from the first driving mode to the second driving mode when an operation for switching the driving mode to the second driving mode has been received in a state in which the speed has become the target speed,
wherein lanes in which the vehicle travels include a passing lane for passing a preceding vehicle; and
switching, by the computer, the driving mode from the first driving mode to the second driving mode when the vehicle is traveling in the passing lane in a state in which the vehicle is executing the first driving mode and the second driving mode is executable and when the first receiver has received an operation of switching the driving mode to the second driving mode after a lane change from the passing lane to a lane other than the passing lane was made and the speed of the vehicle became a target speed or after the speed of the vehicle became the target speed and then the lane change from the passing lane to the lane other than the passing lane was made.

* * * * *